US012213546B2

(12) United States Patent
Baxter

(10) Patent No.: US 12,213,546 B2

(45) **Date of Patent: *Feb. 4, 2025**

(54) RECEPTACLE AND TEMPLATE

(71) Applicant: Lilliana Baxter, Dallas, TX (US)

(72) Inventor: Lilliana Baxter, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,243

(22) Filed: Apr. 3, 2023

(65) Prior Publication Data

US 2023/0240399 A1 Aug. 3, 2023

Related U.S. Application Data

(63) Continuation of application No. 17/560,757, filed on Dec. 23, 2021, now Pat. No. 11,617,404.

(60) Provisional application No. 63/130,604, filed on Dec. 24, 2020, provisional application No. 63/130,601, filed on Dec. 24, 2020, provisional application No. 63/130,602, filed on Dec. 24, 2020.

(51) Int. Cl.

| | |
|---|---|
| ***A45C 13/02*** | (2006.01) |
| ***A41D 27/20*** | (2006.01) |
| ***B26D 7/00*** | (2006.01) |
| ***B65D 30/20*** | (2006.01) |
| ***B65D 33/14*** | (2006.01) |

(52) U.S. Cl.

CPC ......... *A41D 27/205* (2013.01); *A41D 27/201* (2013.01); *A45C 13/02* (2013.01); *B26D 7/0006* (2013.01); *B65D 31/10* (2013.01); *B65D 33/14* (2013.01); *A41D 27/20* (2013.01)

(58) Field of Classification Search

CPC ...... A41D 27/20; A41D 27/205; A45C 13/02; B65D 31/10

See application file for complete search history.

(56) References Cited

U.S. PATENT DOCUMENTS 2,179,214 A * 11/1939 Hallbauer .............. A45C 15/06 362/156

3,798,781 A * 3/1974 Wolfe ...................... A41H 3/01 33/563

(Continued)

FOREIGN PATENT DOCUMENTS

CN 203913513 * 11/2014

CN 204157719 * 2/2015

(Continued)

*Primary Examiner* — Tajash D Patel

(74) *Attorney, Agent, or Firm* — Pillsbury Winthrop Shaw Pittman LLP

(57) ABSTRACT

Provided is a receptacle system, including a receptacle chassis that defines a volume and that defines, at an edge of the receptacle chassis, an aperture that provides access to the volume. The receptacle chassis includes a first face that is adjacent the volume, and a second face that is opposite the receptacle chassis from the first face and that is adjacent to an exterior volume. The receptacle chassis includes an object securing system that is included on at least one of the first face or the second face, and that is configured to secure the receptacle chassis to an object. Also, provided is a receptacle template system, including a planar member defines a first slot and a second slot that extend through the planar member from a first face to a second face and that are configured to receive a cutting device.

20 Claims, 17 Drawing Sheets

(56) References Cited

U.S. PATENT DOCUMENTS

| | | | | | |
|---|---|---|---|---|---|
| 5,566,869 | A * | 10/1996 | Katz | A45F 5/00 224/267 |
| 6,023,790 | A * | 2/2000 | Schwartz | A41D 27/204 2/243.1 |
| 10,306,034 | B1 * | 5/2019 | Puglisi | H04M 1/04 |
| 10,863,805 | B1 * | 12/2020 | Cudden | A45C 3/06 |
| 11,617,404 | B2 * | 4/2023 | Baxter | A41D 27/201 2/250 |
| 2014/0123368 | A1 * | 5/2014 | Shamy | A41D 27/20 2/227 |
| 2015/0106999 | A1 * | 4/2015 | Holtry | A41D 27/20 2/227 |
| 2019/0387822 | A1 * | 12/2019 | Adams | A41D 27/20 |
| 2021/0251320 | A1 * | 8/2021 | Fernandez-Freitas | A41D 13/012 |
| 2022/0039498 | A1 * | 2/2022 | Schickel | A41D 27/20 |

FOREIGN PATENT DOCUMENTS

| | | | |
|---|---|---|---|
| CN | 207940362 | * | 10/2018 |
| CN | 108783639 | * | 11/2018 |
| CN | 209135546 | * | 7/2019 |
| CN | 110122962 | * | 8/2019 |
| CN | 209412470 | * | 9/2019 |
| CN | 210259426 | * | 4/2020 |
| EP | 0269255 | * | 6/1988 |

* cited by examiner

RECEPTACLE AND TEMPLATE

CROSS-REFERENCE TO RELATED APPLICATIONS

This patent is a continuation of U.S. Non-Provisional patent application Ser. No. 17/560,757, titled RECEPTACLE AND TEMPLATE, filed Dec. 23, 2021, which claims the benefit of U.S. Provisional Patent Application 63/130,601, filed Dec. 24, 2020, titled ATTACHABLE POCKET AND TEMPLATE; U.S. Provisional Patent Application 63/130,602, filed Dec. 24, 2020, titled ATTACHABLE POCKET; and U.S. Provisional Patent Application 63/130,604, filed Dec. 24, 2020 titled ATTACHABLE STORAGE BAG AND TEMPLATE. The entire content of each afore-listed earlier-filed application is hereby incorporated by reference for all purposes.

BACKGROUND

1. Field

The present disclosure relates generally to receptacles and more particularly to an attachable receptacle and a template for installing the attachable receptacle.

2. Description of the Related Art

Consumer goods such as clothing, furniture, luggage, coolers, transportation vehicles, purses, and other consumer goods are ubiquitous in today's marketplace. These consumer goods serve many different purposes. For example, coolers may keep food products cool for an extended period of time, clothing can keep a user warm and/or are designed as coverings for the user to participate in a particular activity, and transportation vehicles may be used by a user to move between various locations. In addition, many of these consumer goods may define volumes or include a receptacle such as a pocket, a bag, a pouch, and/or other receptacle to store other consumer goods.

SUMMARY

The following is a non-exhaustive listing of some aspects of the present techniques. These and other aspects are described in the following disclosure.

Some aspects include a receptacle system, including: a receptacle chassis that defines a volume and that defines, at a first edge of the receptacle chassis, an aperture that provides access to the volume, wherein the receptacle chassis includes: a first face that is adjacent the volume; and a second face that is opposite the receptacle chassis from the first face and that is adjacent to an exterior volume; and an object securing system that is included on at least one of the first face or the second face, and that is configured to secure the receptacle chassis to an object.

Some aspects include receptacle template system, including a planar member having a first face and a second face that is opposite the planar member from the first face, wherein the planar member: defines a first slot that extends through the planar member from the first face to the second face and that is configured to receive a cutting device, and defines a second slot that extends through the planar member from the first face to the second face and that is configured to receive a cutting device.

Some aspects include method, including: positioning, on an object, a receptacle template system that includes a planar member having a first template face and a second template face that is opposite the planar member from the first template face; cutting, using a cutting device, the object by moving the cutting device along a template aperture defined by the receptacle template system such that the object defines an object aperture; and coupling, to the object, a receptacle chassis that defines a volume and that defines, at a first edge of the receptacle chassis, an aperture that provides access to the volume, wherein the receptacle chassis includes: a first receptacle face that is adjacent the volume; and a second receptacle face that is opposite the receptacle chassis from the first receptacle face and that is adjacent to an exterior volume, and wherein the coupling the receptacle chassis to the object includes securing, to a portion of the object that defines the object aperture, an object securing system that is included on a trim element that is coupled to the first edge of the receptacle chassis such that the aperture of the receptacle chassis is accessible via the object aperture.

BRIEF DESCRIPTION OF THE DRAWINGS

The above-mentioned aspects and other aspects of the present techniques will be better understood when the present application is read in view of the following FIGS. in which like numbers indicate similar or identical elements.

Figures 1A, 1B, 1C, 1D:
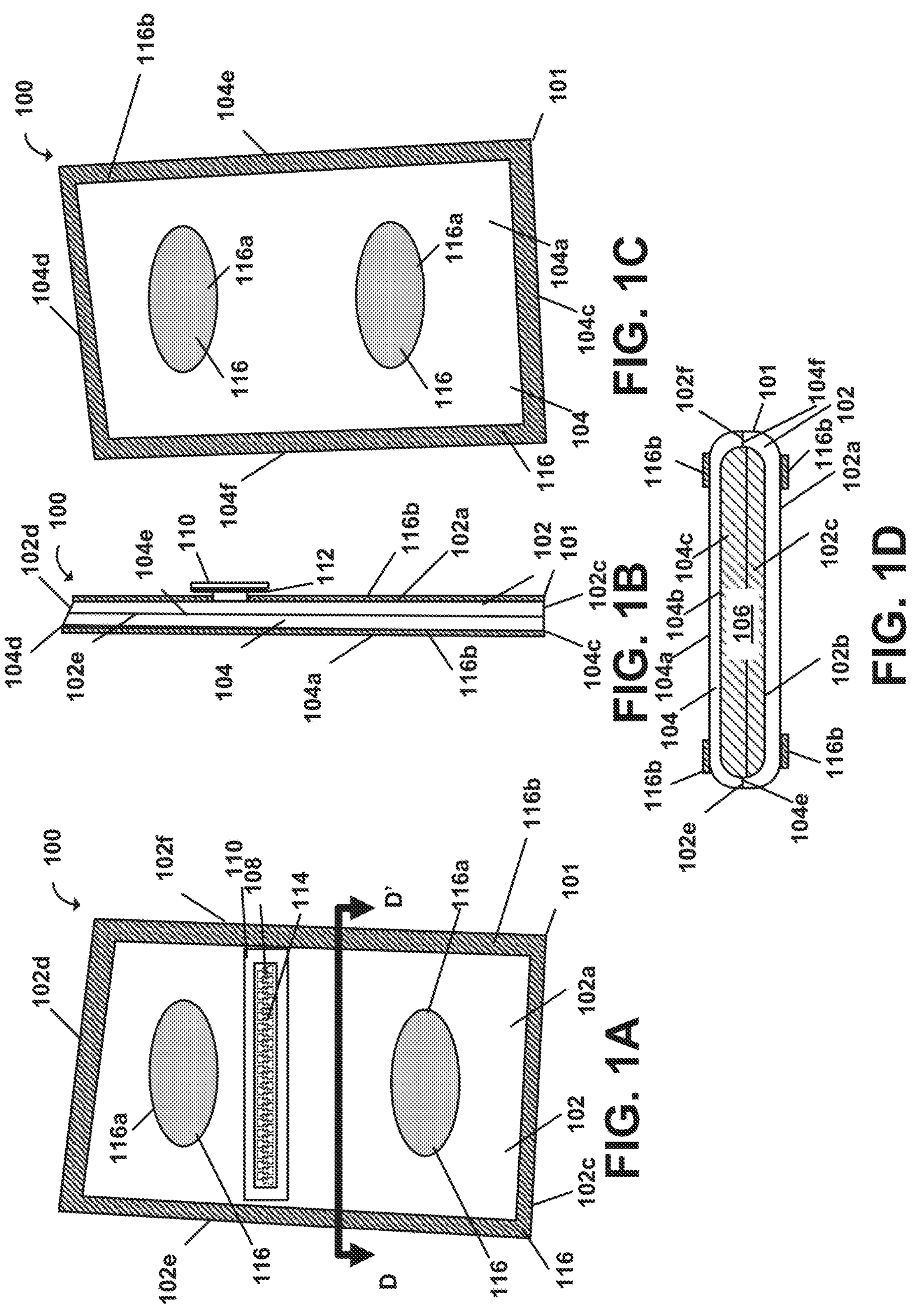
FIG. 1A illustrates a front view of a receptacle system in accordance with some embodiments of the present disclosure.
FIG. 1B illustrates a side view of the receptacle system of FIG. 1A in accordance with some embodiments of the present disclosure.
FIG. 1C illustrates a rear view of the receptacle system of FIGS. 1A and 1B in accordance with some embodiments of the present disclosure.
FIG. 1D illustrates a cross-sectional view of the receptacle system of FIG. 1 along the cutting plane DD' of FIG. 1A, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of consumer goods. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As described above, consumer goods (e.g., clothing, furniture, luggage, coolers, transportation vehicles, purses, and other consumer goods) may include one or more receptacles such as pockets, bags, pouches, and/or other receptacles for storing other consumer goods or objects (e.g., a set of keys, a wallet, a mobile phone, and/or other objects). In some instances, the consumer goods themselves (e.g., a purse, a suitcase, or a cooler) may define a volume for storing goods or objects. In other examples, some consumer goods lack storage completely. For example, some clothing may lack pockets or a seat in a transportation vehicle may lack a pouch. As such, as the user purchases and uses a consumer good, the user may determine that the volumes defined by the consumer good, or the current receptacles of the consumer product, are inadequate for the user's storage needs. Also, a user may find, during use of a consumer good that lacks receptacles, it would be beneficial to have a receptacle on the consumer good.

Some conventional systems add receptacles to post-manufactured consumer goods in various manners. For example, some pockets may be added to pants by positioning a pocket on a pair of pants and hammering rivets closed to secure the pocket. Other solutions require sewing a pocket to a pair of pants and using a template to mark where cuts for the pocket should go. Some systems offer temporary pockets.

However, current solutions have one or more of the following drawbacks. For example, temporary solutions require continued cost for replacement of temporary pockets and do not provide the durability of more substantial and permanent storage. Furthermore, some solutions may not provide inconspicuous concealment for items and/or cannot be added to a variety of consumer goods or materials. Some of the solutions require burdensome labor or special skills (e.g., sewing). Some systems do not provide adequate storage based on the need and/or do not provide storage that could be maintained like the rest of the consumer good. Furthermore, some solutions do not provide an appearance of integration with the consumer good to which a pocket is attached or fail to provide a template for assisting the installation of the pocket.

Systems and methods of the present disclosure seeks to provide a solution to these problems by providing a combination of a receptacle system and receptacle template, which allows for the insertion of receptacle system by a user. In various embodiments, a receptacle chassis included in the receptacle system may include a textile material such as, for example, cotton, silk, linen, leather, plastic and/or other textile materials that would be apparent to one of skill in the art in possession of the present disclosure. However, other materials that are rigid, semi-rigid, flexible, and/or stretchable or a combination of material may be contemplated. In other examples, the material may match the material of the consumer good, an example, "tech" fabrics used in athlete wear could be used to provide the same breathable and quick drying experience the user would except from the rest of the consumer good or object. The receptacle chassis may define a volume for storage, but could also have added decorative appeal for the consumer good. For example, the receptacle system may include blue silk that is insertable into a white pillowcase, if the material is pulled out while retrieving items (e.g., a sleep mask) within the volume defined by the receptacle system, then the contrast of the blue silk may add decorative contrast and customization.

The receptacle chassis may include one or more base portions that may be sewn or attached together according to common goods industry standards for making receptacles. The receptacle chassis would attach to the consumer good in different places, in such a way as to allow the added receptacle system to be used and accessed much like a receptacle would function within a consumer good. The receptacle chassis may be a large and expansive size, such as a size to fit a cellular telephone. However, it is contemplated that the receptacle chassis may be of a smaller size (e.g., smaller than current pocket on a pair of pants that the consumer feels is too large). To achieve the large size, the receptacle chassis may be shaped and/or include a material to extended further in any direction of a three-dimensional space depending on the use it was needed for and the consumer good to which it would be attached. The receptacle chassis may also could include an expandable member such as, for example, an accordion pleat, a gusset, and/or any other expandable member that would be apparent to one of skill in the art in possession of the present disclosure. The expandable member may be located along one or more of the edges/faces of the receptacle chassis to allow for expansion or contraction of the receptacle chassis.

In various embodiments, the receptacle system may be coupled to the consumer good via an object securing system that may include one or more object securing elements such as, for example, a sheet of adhesive, a spray adhesive, magnets, a combination of adhesive and a loop and hook system, and/or any other fastener or coupling device that would be apparent to one of skill in the art in possession of the present disclosure. The object securing elements may include elements that require special skill such as a needle and thread. However, preferably the object securing element is selected so that a user does not require special skill to install the receptacle system on the consumer good or object. In a specific example, for ease of application and correct positioning, the object securing system may include two types of object securing elements such as, for example, two different types of adhesive. One of the object securing elements may be temporary and the other permanent. The temporary object securing element may be confined to a few small areas of the receptacle chassis and/or include an object securing element that requires less force to decouple the receptacle chassis from the consumer good than the permanent object securing element.

In various embodiments, the one or more object securing elements may be provided on one or more of the faces of the receptacle chassis. For example, the permanent object securing element and the temporary securing element may be on a front face of the receptacle chassis, which would adhere to the front inside of the consumer good and any further placement to help secure the consumer good integrity or functionality, such as extending the receptacle chassis either outside the consumer good via a trim piece and attaching to the front of the consumer good, attaching to the inside top portion of the consumer good, or both. The receptacle aperture defined by the receptacle chassis that provides access to the volume, depending on the consumer good could be secured in place with a decorative trim surround on the outside of the consumer good. The trim piece could consist of with zippers, buttons, toggles, clasps, flaps, or a combination of finishes, but are not limited to these options.

The trim element may remain open and accessible, or the trim element may include a trim fastener that may be configured to close or semi-close the receptacle aperture with zippers, buttons, toggles, clasps, flaps, and/or other trim fasteners. This would both function as a security and as an added decorative feature to the consumer good. The receptacle chassis may define a receptacle aperture shape such as a horizontal aperture, a vertical aperture, a forward slash shaped aperture, a backward slash shaped aperture, a quarter circle or "J" shaped aperture, and/or any other shape that would be apparent to one of skill in the art in possession of the present disclosure.

In various embodiments, a receptacle template system may be configured as a measuring guide and cutting plate to make a cut (e.g., an object aperture) in the object. The receptacle template system may include a material such as, for example, plastic, metal, wood, fiberglass and/or any other material that would be apparent to one of skill in the art in possession of the present disclosure. The receptacle template system may also include a cutting device system. The receptacle template system with the measuring guide and the cutting device system may be configured to cut the consumer good to provide an object aperture so that a receptacle aperture and corresponding receptacle chassis could be added to a consumer good where there was no object aperture and/or receptacle previously provided with the consumer good. The receptacle template system may provide slots that define various aperture shapes, one of which would correspond with a shape of a receptacle aperture. The receptacle template may also allow a user to align and adhere the receptacle system after the cut is made in the consumer good.

The cutting blade included in the cutting device system may include a material such as plastic, metal, ceramic, and/or other material used to cut a fabric material of the consumer good or may include a material that can cut the specific material of the consumer good.

The receptacle template system may include an adjustment system that may be configured to adjust the size and/or shape of the receptacle template system by, for example, sliding pieces which slide together and apart, and could be magnetically secured and extended with additional pieces, could be made from materials that stretch and expand accordion style, or unfold from each other, but are not limited to these options.

To make a cut or object aperture, the receptacle template system may be placed on top of the consumer good with the consumer good right-side in. A guard member (backing of the receptacle template system) may be placed inside the consumer good and secured to the template planar member with measuring guide, so that no unwanted damage may occur to the consumer good during the object aperture cutting process. The securing mechanism could be magnetic, have an opening between the template planar member and guard member to slide the consumer good into, or could have another user-friendly method of securing together. template planar member and/or the guard member, could have a lip or interlocking alignment feature around the outer edge to more accurately align the two pieces once placed on the consumer good, this could further prevent damage to the consumer good and provide peace of mind for the user cutting the object apertures and/or aligning and adhering the receptacle system.

Referring now to FIGS. 1A, 1B, 1C, and 1D an embodiment of a receptacle system 100 is illustrated. In an embodiment, the receptacle system 100 may provide a pocket, a bag, a pouch, a container, a repository, a vessel, and/or any other type of storage device that would be apparent to one of skill in the art in possession of the present disclosure. In a specific example, the receptacle system 100 may be configured to be inserted into or installed on an object such as a consumer good and may be configured to hold or otherwise contain another object and/or another consumer good. The receptacle system 100 may include a receptacle chassis 101. The receptacle chassis 101 may include a first chassis base portion 102 and a second chassis base portion 104. The first chassis base portion 102 may include a first chassis front face 102*a* (or edge), a first chassis rear face 102*b* that is located opposite the first chassis base portion 102 from the first chassis front face 102*a*, and at least one wall extending between the first chassis front face 102*a* and the first chassis rear face 102*b*. For example, the first chassis base portion 102 may include a first chassis bottom face 102*c* extending between the first chassis front face 102*a* and the first chassis rear face 102*b*, a first chassis top face 102*d* located opposite the first chassis base portion 102 from the first chassis bottom face 102*c* and extending between the first chassis front face 102*a* and the first chassis rear face 102*b*, and a pair of first chassis side faces 102*e* and 102*f* that are located opposite each other on the first chassis base portion 102 and that each extend between the first chassis front face 102*a*, the first chassis rear face 102*b*, the first chassis bottom face 102*c*, and the first chassis top face 102*d*.

The second chassis base portion 104 may include a second chassis front face 104*a*, a second chassis rear face 104*b* that is located opposite the second chassis base portion 104 from the second chassis front face 104*a*, and at least one wall extending between the second chassis front face 104*a* and the second chassis rear face 104*b*. For example, the second chassis base portion 104 may include a second chassis bottom face 104*c* extending between the second chassis front face 104*a* and the second chassis rear face 104*b*, a second chassis top face 104*d* located opposite the second chassis base portion 104 from the second chassis bottom face 104*c* and extending between the second chassis front face 104*a* and the second chassis rear face 104*b*, and a pair of second chassis side faces 104*e* and 104*f* that are located opposite each other on the second chassis base portion 104 and that each extend between the second chassis front face 104*a*, the second chassis rear face 104*b*, the second chassis bottom face 104*c*, and the second chassis top face 104*d*. The second chassis side faces 104*e* and 104*f* may be coupled to the first chassis side faces 102*e* and 102*f*, respectively. In various embodiments, the second chassis bottom face 104*c* and the second chassis top face 104*d* may be coupled to the first chassis bottom face 102*c* and the first chassis top face 102*d*, respectively. For example, the first chassis base portion 102 and the second chassis base portion 104 may be coupled together by sewing, adhering, fastening, and/or by another other coupling that would be apparent to one of skill in the art in possession of the present disclosure. While the receptacle chassis 101 is illustrated has having a first chassis base portion 102 and a second chassis base portion 104, it is contemplated that the receptacle chassis 101 be contiguous such that only a single chassis base portion is included in the receptacle chassis 101 or it is contemplated that the receptacle chassis 101 include more than two base portions. The receptacle chassis 101 may include a textile material such as, for example, cotton, silk, linen, leather, plastic and/or other textile materials that would be apparent to one of skill in the art in possession of the present disclosure. However, other materials that are rigid, semi-rigid, flexible, and/or stretchable or a combination of material may be contemplated and still fall under the scope of the present disclosure.

The receptacle chassis 101 may define a volume 106 that is adjacent the first chassis rear face 102*b* and the second chassis rear face 104*b*. The receptacle chassis 101 may define a receptacle aperture 108. The receptacle aperture 108 may provide a pathway between the volume 106 and a volume exterior to the receptacle chassis 101. The receptacle aperture 108 may be defined on one or more of the faces of the receptacle chassis 101. While only a single receptacle aperture (the receptacle aperture 108) defined by the first chassis front face 102*a* is illustrated in FIG. 1A, one of skill in the art in possession of the present disclosure will recognize that the receptacle aperture 108 may be defined by another face or that the receptacle chassis 101 may define a plurality of receptacle apertures.

In various embodiments, the receptacle system 100 may include a trim element 110. The trim element 110 may be coupled to the first chassis front face 102*a*. However, the trim element 110 may be coupled to any of the first chassis faces 102*a*-102*f* or the second chassis faces 104*a*-104*f*. The trim element 110 may encompass or partially encompass the portion of the first chassis front face 102*a* that defines the receptacle aperture 108. In an embodiment, the trim element 110 is configured to couple to a portion of an object or a consumer good that defines an object aperture such that the receptacle aperture 108 of the receptacle chassis 101 is accessible via the object aperture. For example, the trim element 110 may include a trim fastener 112 such as, for example, an adhesive, a set of hooks for a hook and loop system, a set of loops, and/or any other trim coupler that may be used to couple the trim element 110 to an object or a consumer good that would be apparent to one of skill in the art in possession of the present disclosure).

The trim element 110 and/or the chassis face that defines the receptacle aperture 108 may further include an aperture closure element 114. The aperture closure element 114 may be configured to transition between an open orientation and a closed orientation, such that the open orientation provides greater access, via the receptacle aperture 108, between the exterior volume and the volume 106 than the closed orientation. For example, the aperture closure element 114 may include a zipper, a button and hook, a snap button, a hook and loop system, and/or any other closure device that is configured to transition between an open and closed or partially closed orientation.

In various embodiments, the receptacle system 100 may include an object securing system 116. The object securing system 116 may include a first set of object securing elements 116*a* that are included on the first chassis front face 102*a* and/or the second chassis front face 102*a*. However, the first set of object securing elements 116*a* may be included on any, a portion of, or all of the faces 102*a*-102*f* included on the first chassis base portion 102 and/or any, a portion of, or all of the faces 104*a*-104*f* included on the second chassis base portion 104. The first set of object securing elements 116*a* may be contiguous or non-contiguous. The first set of object securing elements 116*a* may be configured to couple to an object receptacle that is received by the receptacle chassis 101 via the receptacle aperture 108 such that an object receptacle (e.g., a pocket on the object) may be housed in the volume 106 and coupled to the first chassis rear face 102*b* and/or the second chassis rear face 104*b*. In other embodiments the first set of object securing elements 116*a* are configured to couple the receptacle chassis 101 to the object.

In various embodiments, the object securing system 116 includes a second set of object securing elements 116*b* that are included on the first chassis front face 102*a* and the second chassis front face 104*a*. The second set of securing elements 116*b* may be configured to couple the receptacle chassis 101 to the object. The second set of object securing elements 116*b* may be contiguous or non-contiguous. The second set of object securing elements 116*b* may be configured to couple to an object receptacle that is received by the receptacle chassis 101 via the receptacle aperture 108 such that an object receptacle (e.g., a pocket on the object) may be housed in the volume 106 and coupled to the first chassis rear face 102*b* and/or the second chassis rear face 104*b*. In other embodiments, the second set of object securing elements 116*a* are configured to couple the receptacle chassis 101 to the object.

In various embodiments, the first set of object securing elements 116*a* includes a first type securing element that, when coupled to the object, requires a first force to decouple that first type securing element from the object. For example, the first type securing element may include a fastener, a set of pins, a loop and hook system, an adhesive, magnets, and/or any other fastener that would be apparent to one of skill in the art in possession of the present disclosure. The first type securing element may be configured for temporary placement of the receptacle chassis 101 on the object. The temporary placement may allow the user, when installing the receptacle system 100 on the object, to position the receptacle system 100 as desired before permanent placement. The first set of object securing elements 116*a* are illustrated in FIGS. 1A and 1C as a first type adhesive.

In various embodiments the second set of object securing elements 112*b* includes a second type securing element that, when coupled to the object, requires a second force to decouple that second type securing element from the object that is greater than the first force of the first set of object securing elements 112*a*. For example, the second type securing element may include a fastener, a set of pins, a loop and hook system, an adhesive, magnets, and/or any other fastener that would be apparent to one of skill in the art in possession of the present disclosure. The second type securing element may be configured for permanent placement of the receptacle chassis 101 on the object. This can be so the user, when installing the receptacle system 100 on the object, can permanently place the receptacle system 100 after determining the ideal position of the receptacle system 100 using the first set of object securing elements 112*a*. The second set of object securing elements 116*b* are illustrated in FIGS. 1A and 1C as a second type adhesive that is stronger than the first type adhesive. However, in other embodiments, the second set of object securing elements 116*b*, by themselves, may not provide a permanent or greater bond that the first set of object securing elements 116*a*, but in combination with the first set of object securing elements 116*a*, the total strength of both the first set of object securing elements 116*a* and the second set of object securing elements 116*b* may provide a great enough bond to provide a "permanent" placement of the receptacle system 100. In various embodiments, the second set of object securing elements 116*b* may located on the face of receptacle chassis such that the second set of object securing elements 116*b* are adjacent to adjacent faces while the first set of object securing elements 116*a* are located on a face such that they are further from adjacent faces.

In various embodiments, the object securing system 116 includes a first type adhesive removable cover that covers the first type adhesive and that indicates the first type adhesive to a user and includes a second type removable adhesive cover that covers the second type removable adhesive and that indicates the second type adhesive. The removable adhesive covers may indicate to the user which cover to remove first. While a specific example of the receptacle system 100 is illustrated in FIGS. 1A-1D, one of skill in the art in possession of the present disclosure will recognize that other variations and embodiments may be contemplated and fall under the scope of the present disclosure as well.

Figure 2A:
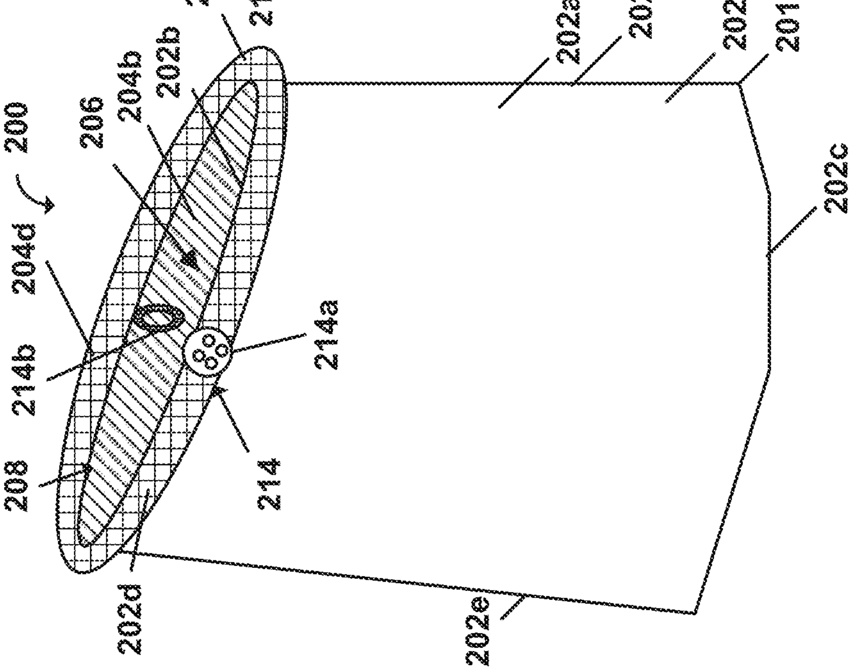
FIG. 2A illustrates a front view of a receptacle system, in accordance with some embodiments of the present disclosure.
Figure 2B:
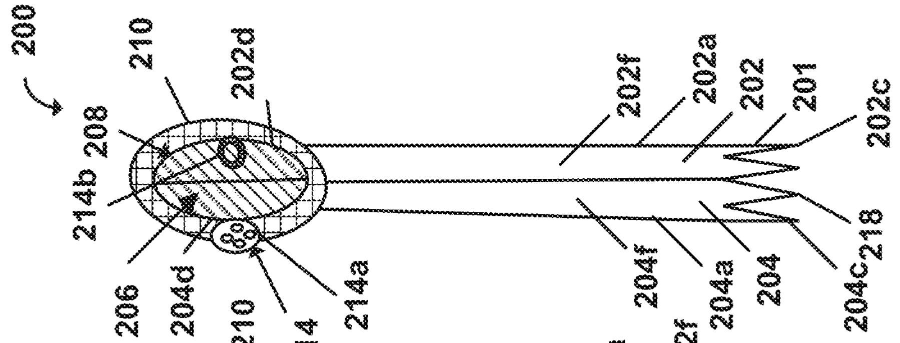
FIG. 2B illustrates a side view of the receptacle system of FIG. 2A, in accordance with some embodiments of the present disclosure.
Figure 2C:
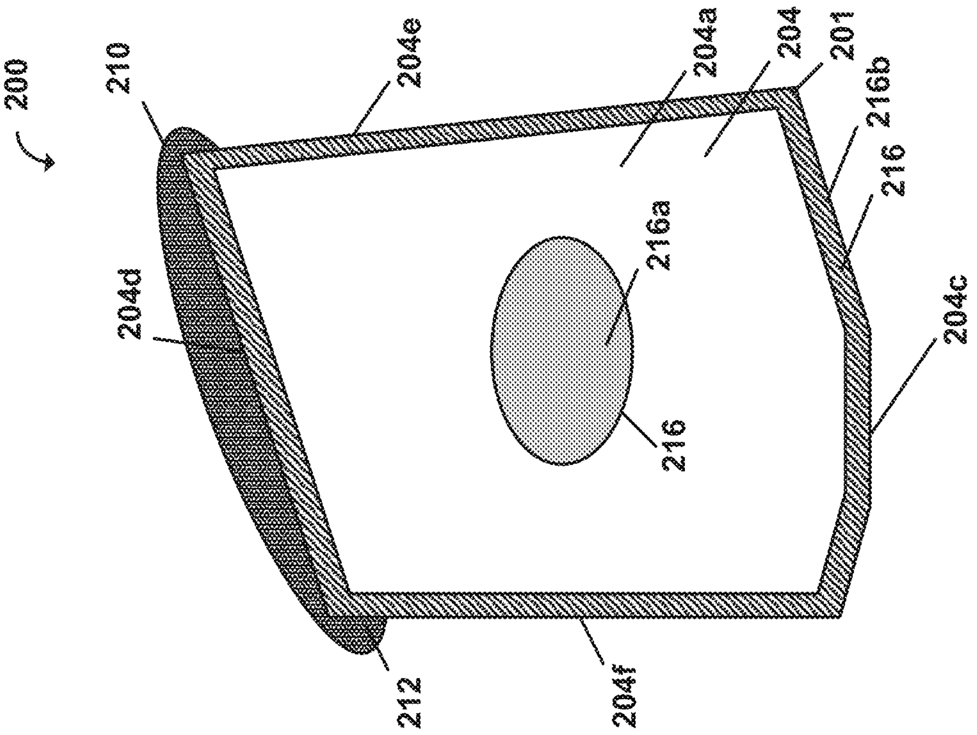
FIG. 2C illustrates a rear view of the receptacle system of FIGS. 2A and 2B, in accordance with some embodiments of the present disclosure.

For example and with reference to FIGS. 2A, 2B, and 2C an alternative embodiment of a receptacle system 200 is illustrated. In an embodiment, the receptacle system 200 may provide a pocket, a bag, a pouch, a container, a repository, a vessel, and/or any other type of storage device that would be apparent to one of skill in the art in possession of the present disclosure. In a specific example, the receptacle system 200 may be configured to be inserted into or installed on an object such as a consumer good and may be configured to hold or otherwise contain another object and/or another consumer good. The receptacle system 200 may include a receptacle chassis 201. The receptacle chassis 201 may include a first chassis base portion 202 and a second chassis base portion 204. The first chassis base portion 202 may include a first chassis front face 202*a* (or edge), a first chassis rear face 202*b* that is located opposite the first chassis base portion 202 from the first chassis front face 202*a*, and at least one wall extending between the first chassis front face 202*a* and the first chassis rear face 202*b*. For example, the first chassis base portion 202 may include a first chassis bottom face 202*c* extending between the first chassis front face 202*a* and the first chassis rear face 202*b*, a first chassis top face 202*d* located opposite the first chassis base portion 202 from the first chassis bottom face 202*c* and extending between the first chassis front face 202*a* and the first chassis rear face 202*b*, and a pair of first chassis side faces 202*e* and 202*f* that are located opposite each other on the first chassis base portion 202 and that each extend between the first chassis front face 202*a*, the first chassis rear face 202*b*, the first chassis bottom face 202*c*, and the first chassis top face 202*d*.

The second chassis base portion 204 may include a second chassis front face 204*a*, a second chassis rear face 204*b* that is located opposite the second chassis base portion 204 from the second chassis front face 204*a*, and at least one wall extending between the second chassis front face 204*a* and the second chassis rear face 204*b*. For example, the second chassis base portion 204 may include a second chassis bottom face 204*c* extending between the second chassis front face 204*a* and the second chassis rear face 204*b*, a second chassis top face 204*d* located opposite the second chassis base portion 204 from the second chassis bottom face 204*c* and extending between the second chassis front face 204*a* and the second chassis rear face 204*b*, and a pair of second chassis side faces 204*e* and 204*f* that are located opposite each other on the second chassis base portion 204 and that each extend between the second chassis front face 204*a*, the second chassis rear face 204*b*, the second chassis bottom face 204*c*, and the second chassis top face 204*d*. The second chassis side faces 204*e* and 204*f* may be coupled to the first chassis side faces 202*e* and 202*f*, respectively. In various embodiments, the second chassis bottom face 204*c* and the second chassis top face 204*d* may be coupled to the first chassis bottom face 202*c* and the first chassis top face 202*d*, respectively. For example, the first chassis base portion 202 and the second chassis base portion 204 may be coupled together by sewing, adhering with an adhesive, fastening with a fastener, and/or by another other coupling that would be apparent to one of skill in the art in possession of the present disclosure. While the receptacle chassis 201 is illustrated as having a first chassis base portion 202 and a second chassis base portion 204, it is contemplated that the receptacle chassis 201 be contiguous such that only a single chassis base portion is included in the receptacle chassis 201 or it is contemplated that the receptacle chassis 201 include more than two base portions.

The receptacle chassis 201 may define a volume 206 that is adjacent the first chassis rear face 204*a* and the second chassis rear face 204*b*. The receptacle chassis 201 may define a receptacle aperture 208. The receptacle aperture 208 may provide a pathway between the volume 206 and a volume exterior to the receptacle chassis 201. The receptacle aperture 208 may be defined on one or more of the faces of the receptacle chassis 201. While only a single receptacle aperture (the receptacle aperture 208) is defined by the first chassis top face 202*d* and the second chassis top face 204*d* is illustrated in FIG. 2A, one of skill in the art in possession of the present disclosure will recognize that the receptacle aperture 208 may be defined by another face or that the receptacle chassis 201 may define a plurality of receptacle apertures.

In various embodiments, the receptacle system 200 may include a trim element 210. The trim element 210 may be coupled to the first chassis top face 202*d* and/or the second chassis top face 204*d*. However, the trim element 210 may be coupled to any of the first chassis faces 202*a*-202*f* or the second chassis faces 204*a*-204*f*. The trim element 210 may encompass or partially encompass a portion of the first chassis top face 202*d* and/or the second chassis top face 204*d* that defines the receptacle aperture 208. In an embodiment, the trim element 210 is configured to couple to a portion of an object or a consumer good that defines an object aperture such that the receptacle aperture 208 of the receptacle chassis 201 is accessible via the object aperture. For example, the trim element 210 may include a trim fastener 212 (e.g, such as an adhesive, a set of hooks for a hook and loop system, a set of loops, and/or any other trim coupler that may be used to couple the trim element 210 to an object or consumer good that would be apparent to one of skill in the art in possession of the present disclosure).

The trim element 210 and/or the chassis face that defines the receptacle aperture 208 may further include an aperture closure element 214. The aperture closure element 214 may be configured to transition between an open orientation and a closed orientation, such that the open orientation provides greater access, via the receptacle aperture 208, between the exterior volume and the volume 206 than the closed orientation. For example, the aperture closure element 214 may include a zipper, a button and hook, a snap button, a hook and loop system, and/or any other closure device that is configured to transition between an open and closed or partially closed orientation. In the illustrated embodiment, the aperture closure element 214 includes a button 214*a* and a loop 214*b*.

In various embodiments, the receptacle system 200 may include an object securing system 216. The object securing system 216 may include a first set of object securing elements 216*a* that are included on the second chassis front face 202*a*. However, the first set of object securing elements 216*a* may be included on any, a portion of, or all of the faces 202*a*-202*f* included on the first chassis base portion 202 and/or any, a portion of, or all of the faces 204*a*-204*f* included on the second chassis base portion 204. The first set of object securing elements 216*a* may be contiguous or non-contiguous. The first set of object securing elements 216*a* may be configured to couple to an object receptacle that is received by the receptacle chassis 201 via the receptacle aperture 208 such that an object receptacle (e.g., a pocket on the object) may be housed in the volume 206 and coupled to the first chassis rear face 202*b* and/or the second chassis rear face 204*b*. In other embodiments the first set of object securing elements 216*a* are configured to couple the receptacle chassis 201 to the object.

In various embodiments, the object securing system 216 includes a second set of object securing elements 216*b* that are included on the second chassis front face 204*a*. The second set of securing elements 216 may be configured to couple the receptacle chassis 201 to the object. The second set of object securing elements 216*b* may be contiguous or non-contiguous. The second set of object securing elements 216*b* may be configured to couple to an object receptacle that is received by the receptacle chassis 201 via the receptacle aperture 208 such that an object receptacle (e.g., a pocket on the object) may be housed in the volume 206 and coupled to the first chassis rear face 202*b* and/or the second chassis rear face 204*b*. In other embodiments the second set of object securing elements 216*a* are configured to couple the receptacle chassis 201 to the object.

In various embodiments, the first set of object securing elements 216*a* includes a first type securing element that, when coupled to the object, requires a first force to decouple that first type securing element from the object. For example, the first type securing element may include a fastener, a set of pins, a loop and hook system, an adhesive, magnets, and/or any other fastener that would be apparent to one of skill in the art in possession of the present disclosure. The first type securing element may be configured for temporary placement of the receptacle chassis 201 on the object. Thus, the user, when installing the receptacle system 200 on the object, may position the receptacle system 200 as desired before permanent placement. The first set of object securing elements 216*a* are illustrated in FIG. 2C as a first type adhesive.

In various embodiments the second set of object securing elements 212*b* includes a second type securing element that, when coupled to the object, requires a second force to decouple that second type securing element from the object that is greater than the first force of the first set of object securing elements 212*a*. For example, the second type securing element may include a fastener, a set of pins, a loop and hook system, an adhesive, magnets, and/or any other fastener that would be apparent to one of skill in the art in possession of the present disclosure. The second type securing element may be configured for permanent placement of the receptacle chassis 201 on the object. The permanent placement may allow the user, when installing the receptacle system 200 on the object, to permanently place the receptacle system 200 after determining the ideal position of the receptacle system 200 using the first set of object securing elements 212*a*. The second set of object securing elements 216*b* are illustrated in FIGS. 2A and 2C as a second type adhesive that is stronger than the first type adhesive. However, in other embodiments, the second set of object securing elements 216*b* by themselves may not provide a permanent or greater bond that the first set of object securing elements 216*a*, but in combination with the first set of object securing elements 216*a*, the total strength of both the first set of object securing elements 216*a* and the second set of object securing elements 216*b* may provide a great enough bond to provide a “permanent” placement of the receptacle system 200. In various embodiments, the second set of object securing elements 216*b* may be located on the face of receptacle chassis such that the second set of object securing elements 216*b* are adjacent to adjacent faces while the first set of object securing elements 216*a* are located on a face such that they are further from adjacent faces.

In various embodiments, the object securing system 216 includes a first type adhesive removable cover that covers the first type adhesive and that indicates the first type adhesive to a user and includes a second type removable adhesive cover that covers the second type removable adhesive and that indicates the second type adhesive. The removable adhesive covers may indicate to the user which cover to remove first. In various embodiments, the receptacle chassis 201 may include an expandable member 218, such as an accordion pleat, gusset, and/or any other expandable member, at the first chassis bottom face 202*c* and/or the second chassis bottom face 204*c* of the receptacle chassis to allow for additional size and expansion. Although not illustrated, the receptacle chassis 101 of FIG. 1A-1D. However, in other embodiments, the expandable member 218 may be included on the faces 202*a*, 202*b*, 202*c*, 202*d*, 202*e*, 202*f*, 204*a*, 204*b*, 204*c*, 204*d*, 204*e*, and/or 204*f*. While a specific example of the receptacle system 200 is illustrated in FIGS. 2A-2C, one of skill in the art in possession of the present disclosure will recognize that other variations and embodiments may be contemplated and fall under the scope of the present disclosure.

Referring now to FIGS. 3A, 3B, 3C, 3D, 3E, 3F and 3G, a receptacle template system 300 is illustrated. In a specific example, the receptacle template system 300 may be configured for positioning onto an object and for making cuts to generate an object aperture in the object. The receptacle template system 300 may include a chassis planar member 301. The chassis planar member 301 may include a first planar sub-member 302 and a second planar sub-member 304. The first planar sub-member 302 may include a first sub-member front face 302*a* (or edge), a first sub-member rear face 302*b* that is located opposite the first planar sub-member 302 from the first sub-member front face 302*a*, and at least one wall extending between the first sub-member front face 302*a* and the first sub-member rear face 302*b*. For example, the first planar sub-member 302 may include a first sub-member bottom face 302*c* extending between the first sub-member front face 302*a* and the first sub-member rear face 302*b*, a first sub-member top face 302*d* located opposite the first planar sub-member 302 from the first sub-member bottom face 302*c* and extending between the first sub-member front face 302*a* and the first sub-member rear face 302*b*, and a pair of first sub-member side faces 302*e* and 302*f* that are located opposite each other on the first planar sub-member 302 and that each extend between the first sub-member front face 302*a*, the first sub-member rear face 302*b*, the first sub-member bottom face 302*c*, and the first sub-member top face 302*d*.

The second planar sub-member 304 may include a second sub-member front face 304*a*, a second sub-member rear face 304*b* that is located opposite the second planar sub-member 304 from the second sub-member front face 304*a*, and at least one wall extending between the second sub-member front face 304*a* and the second sub-member rear face 304*b*. For example, the second planar sub-member 304 may include a second sub-member bottom face 304*c* extending between the second sub-member front face 304*a* and the second sub-member rear face 304*b*, a second sub-member top face 304*d* located opposite the second planar sub-member 304 from the second sub-member bottom face 304*c* and extending between the second sub-member front face 304*a* and the second sub-member rear face 304*b*, and a pair of second sub-member side faces 304*e* and 304*f* that are located opposite each other on the second planar sub-member 304 and that each extend between the second sub-member front face 304*a*, the second sub-member rear face 304*b*, the second sub-member bottom face 304*c*, and the second sub-member top face 304*d*.

While the template planar member 301 is illustrated as having a first planar sub-member 302 and a second planar sub-member 304, it is contemplated that the template planar member 301 be contiguous such that only a single planar member is included in the template planar member 301 or it is contemplated that the template planar member 301 include more than two planar sub-members. In various embodiments, the receptacle template system 300 may include an adjustment system 306 that may be configured to adjust the first chassis base portion 302 and the second planar sub-member 304 in one or more dimensions (e.g., adjust the length, the width, and/or the height of the template planer member 301). In the illustrated embodiment, the adjustment system 306 includes a length adjustment system. The length adjustment system includes one or more extension members. In the illustrated example, the extension members may include an extension member 308*a* that extends from the first sub-member top face 302*d* and the first sub-member side face 302*f*, an extension member 308*b* that extends from the first sub-member bottom face 302*c* and the first sub-member side face 302*f*, an extension member 308*c* that extends from the second sub-member top face 304*d* and the second sub-member side face 304*e*, and an extension member 308*d* that extends from the second sub-member bottom face 304*c* and the second sub-member side face 304*e*. One or more of the extension members 308*a*-308*d* may include a measurement guide (e.g., ruler markings) to assist a user in making symmetric measurements or provide preferred spacing between receptacle cuts in the object. While four extension members 308*a*-308*d* are illustrated, other configurations of extension members and numbers of extension members are contemplated. For example, a pair of extension members may extend from the first sub-member side face 302*f* and the second sub-member side face 304*e* that are configured to couple together and adjust the length of the template planar member 301. In other examples, a single extension member may extend from the first sub-member side face 302*f* and couple directly with the second planar sub-member 304.

Figure 3A:
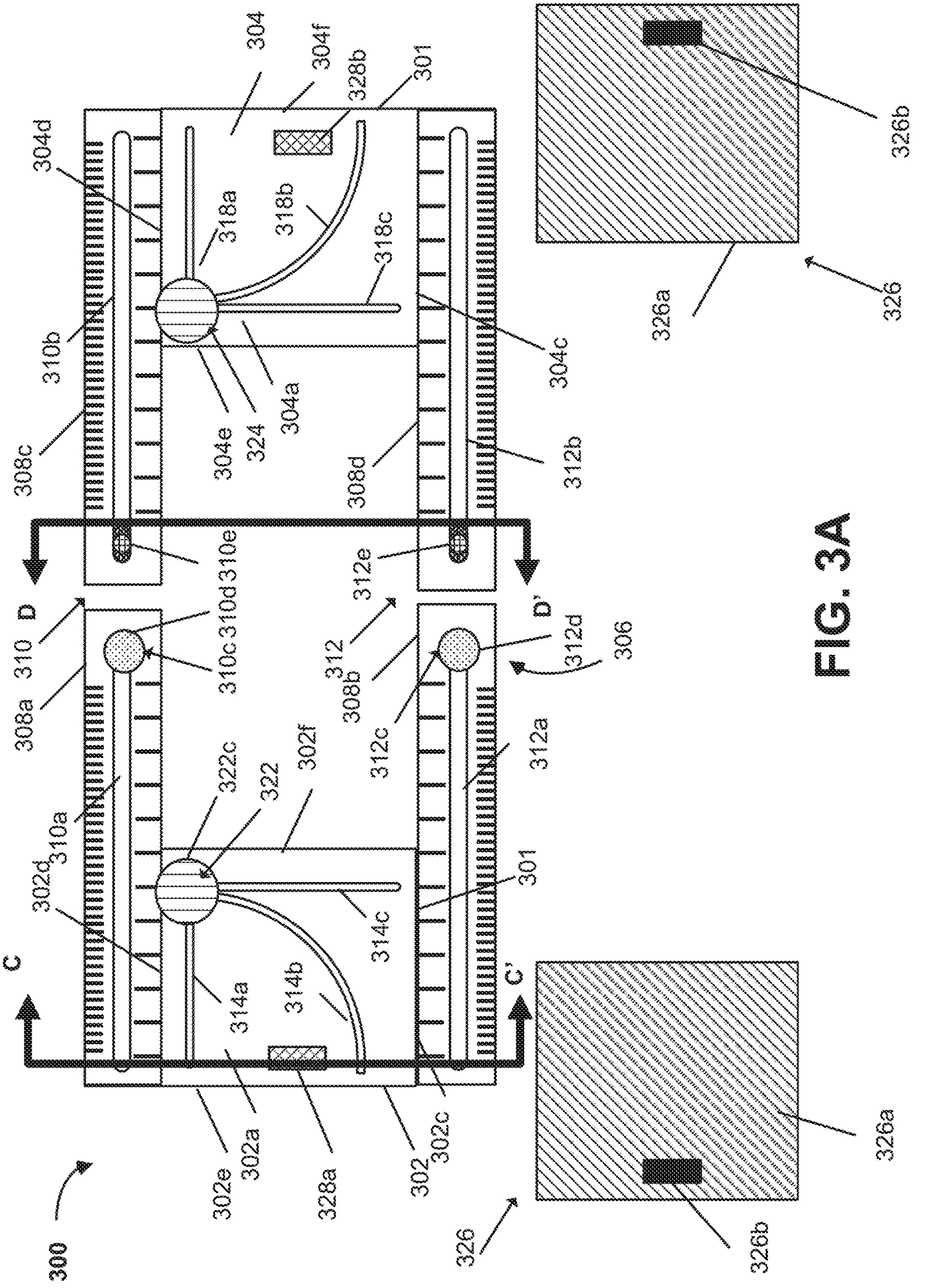
FIG. 3A illustrates a front view of a receptacle template system, in accordance with some embodiments of the present disclosure.
Figure 3B:
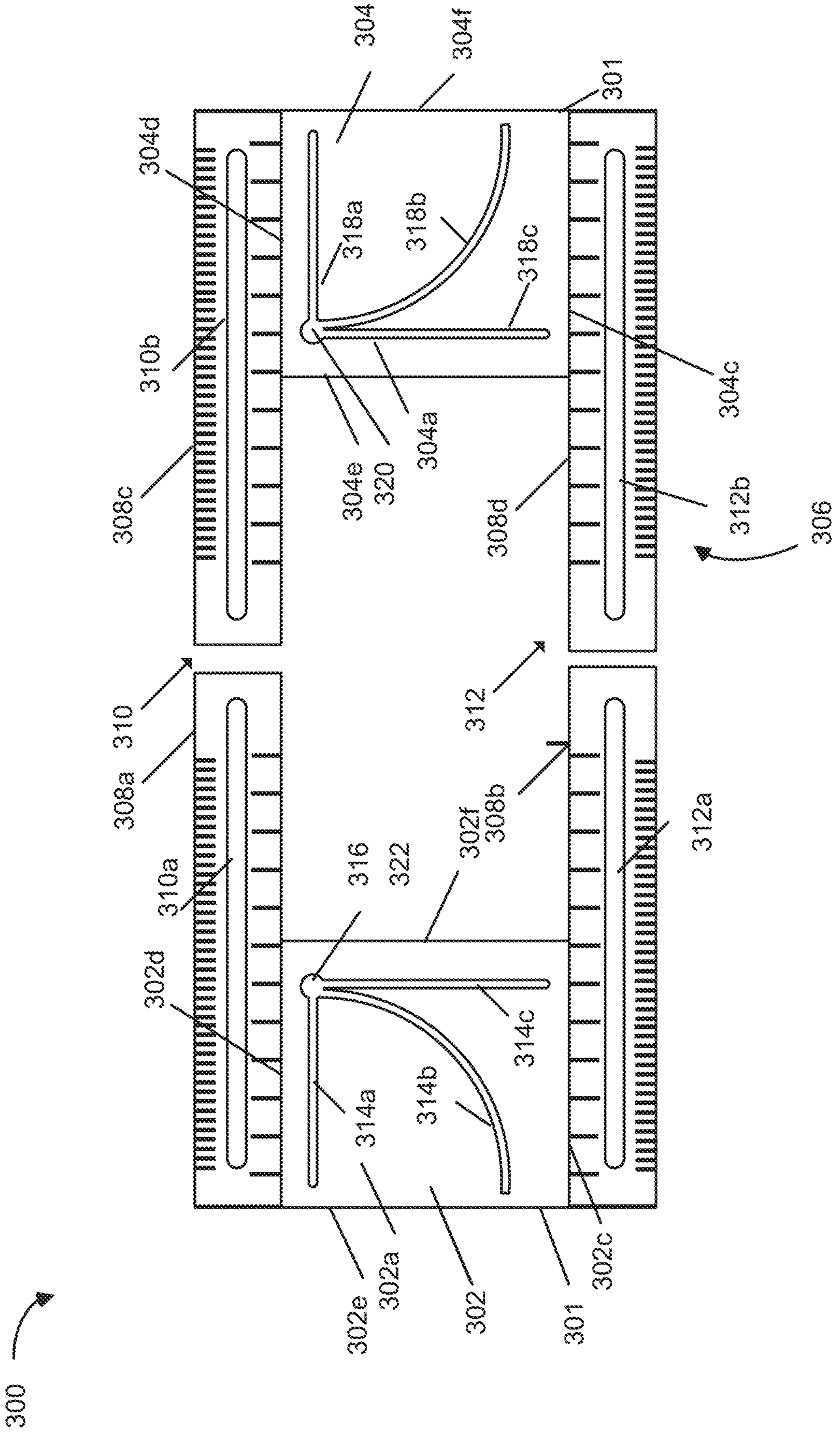
FIG. 3B illustrates a front view of a template planar member of the receptacle template system of FIG. 3A, in accordance with some embodiments of the present disclosure.
Figure 3D:
FIG. 3D illustrates a cross-sectional view of the receptacle template system of FIG. 3A along the cutting plane DD' of FIG. 3A, in accordance with some embodiments of the present disclosure.
Figure 3C:
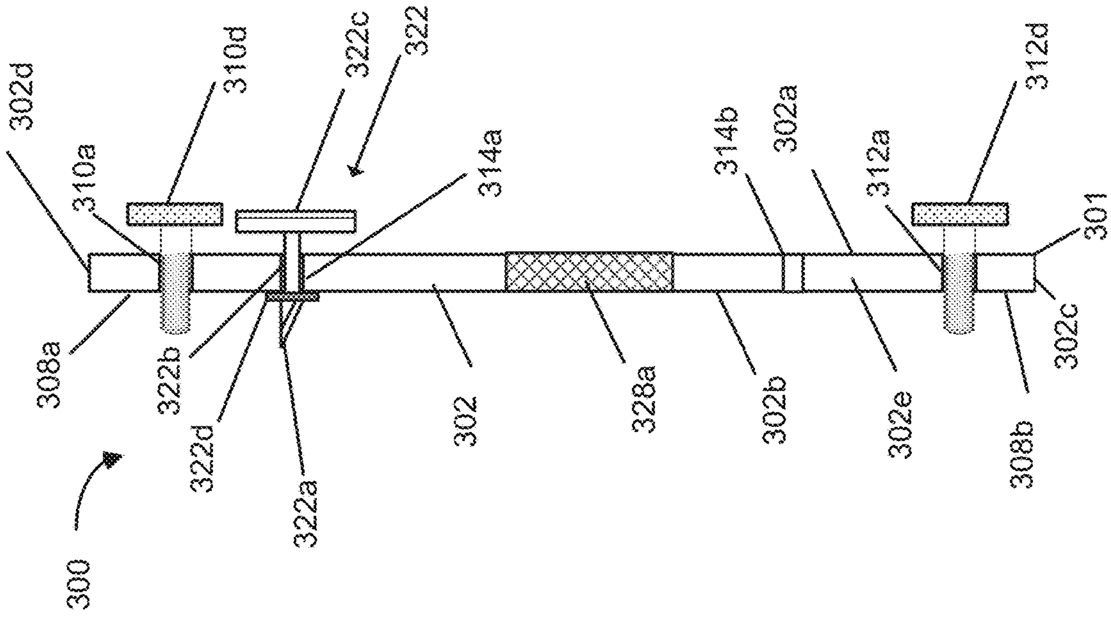
FIG. 3C illustrates a cross-sectional view of the receptacle template system of FIG. 3A along the cutting plane CC' of FIG. 3A, in accordance with some embodiments of the present disclosure.
Figure 3E:
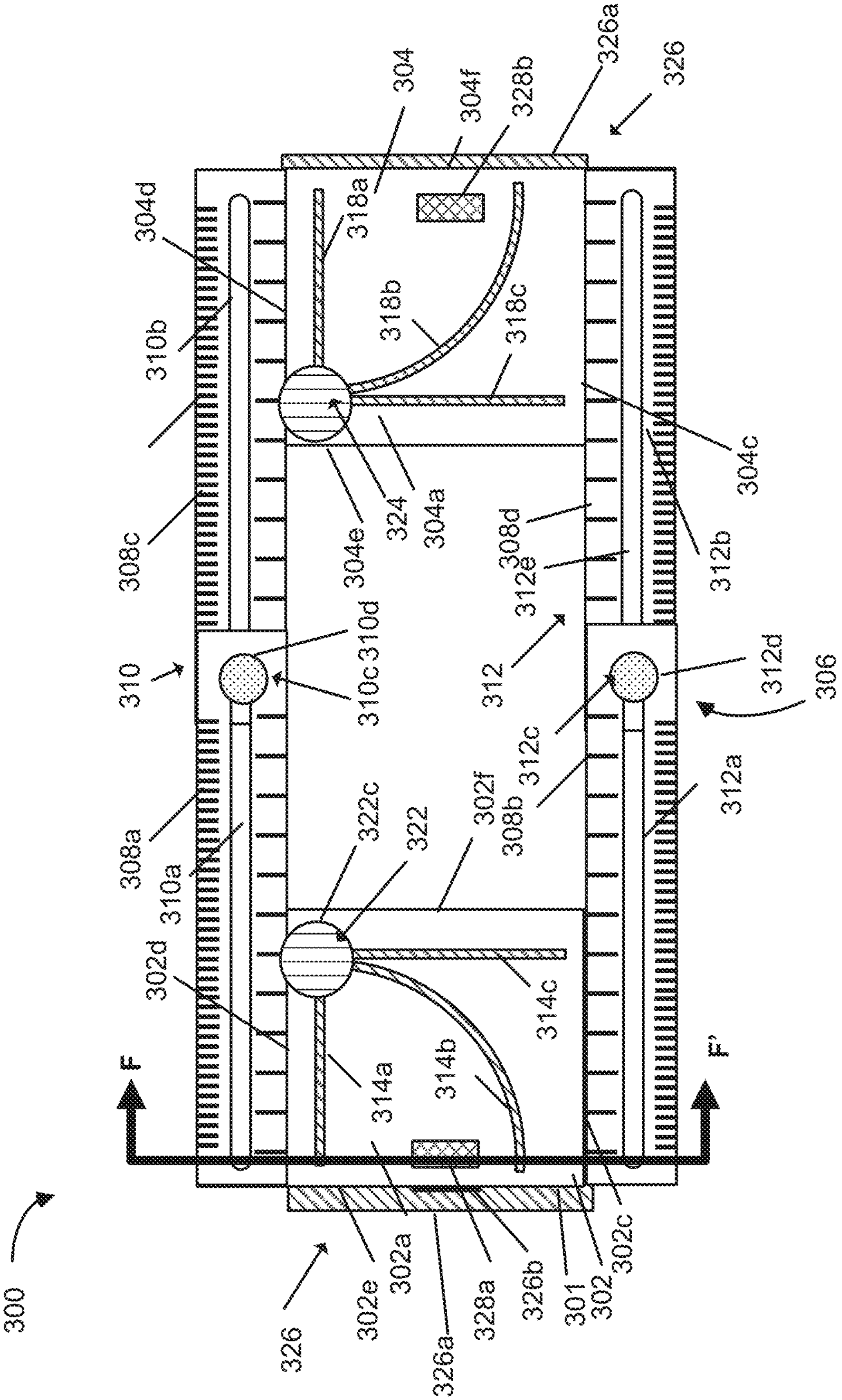
FIG. 3E illustrates the front view of a receptacle template system in an assembled orientation, in accordance with some embodiments of the present disclosure.
Figure 3F:
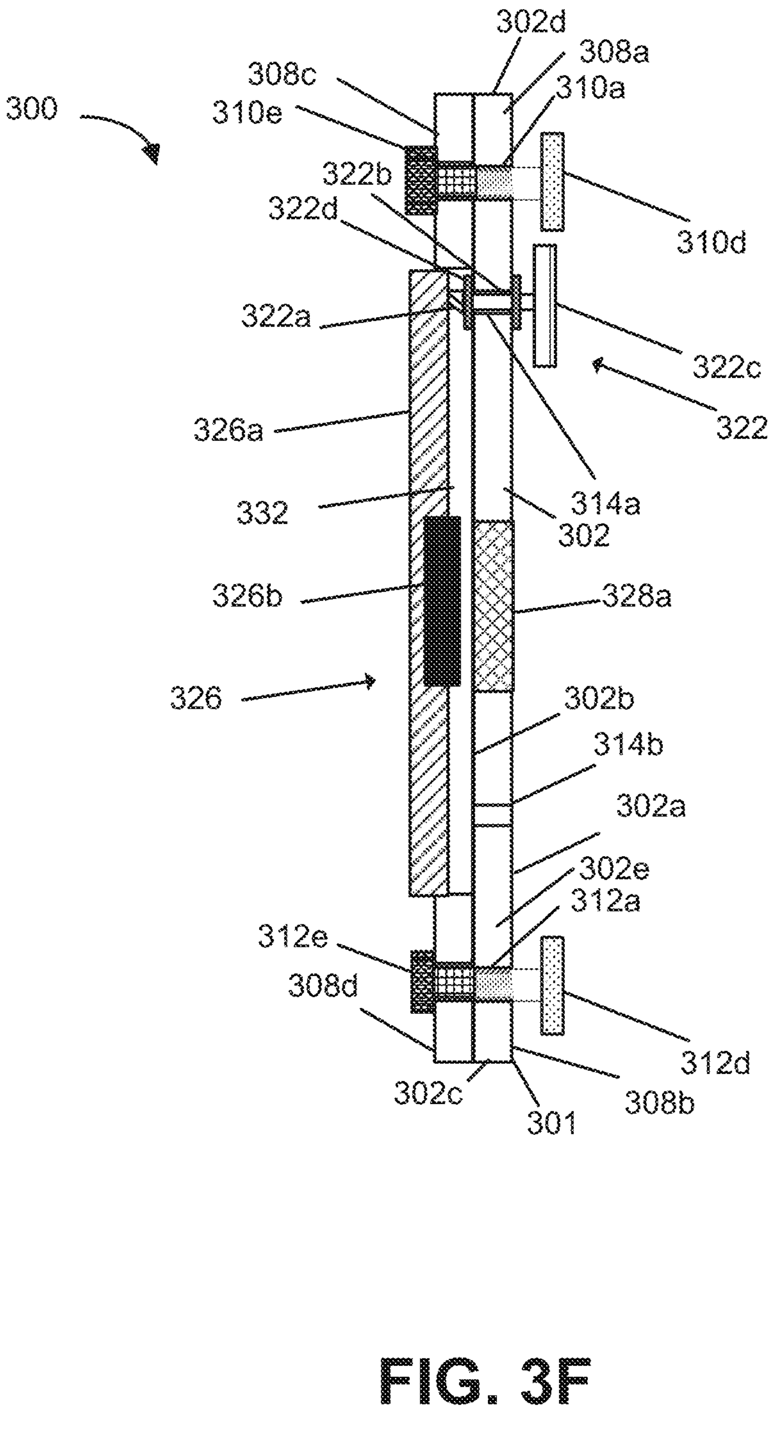
FIG. 3F illustrates a cross-sectional view of the receptacle template system of FIG. 3E along the cutting plane FF' of FIG. 3E, in accordance with some embodiments of the present disclosure.
Figure 3G:
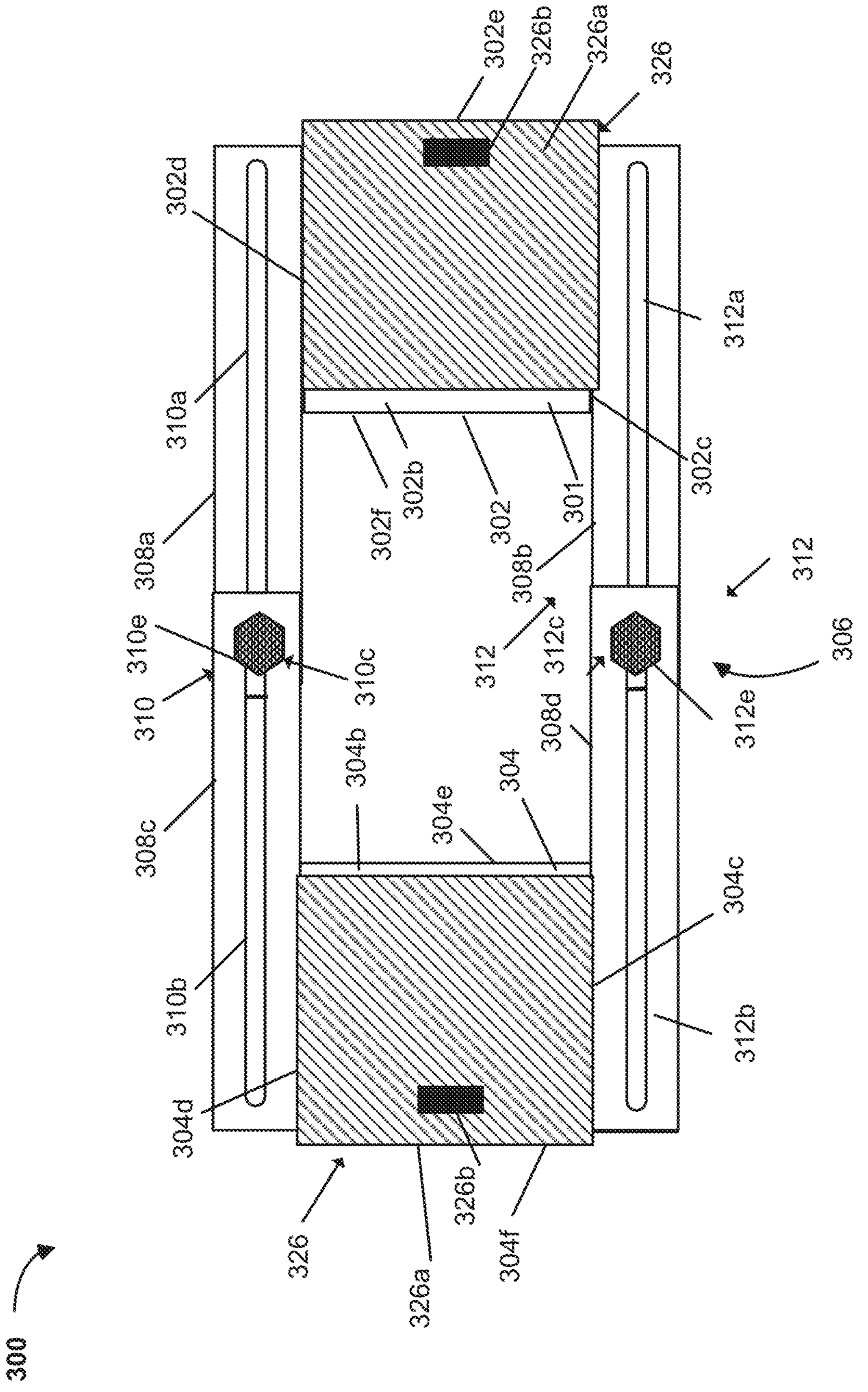
FIG. 3G illustrates a rear view of the receptacle template system in the assembled orientation of FIG. 3E, in accordance with some embodiments of the present disclosure.

In various embodiments, the extension members 308*a* and 308*c* may be configured to couple together, as illustrated in FIG. 3E, FIG. 3F, and FIG. 3G, using an extension member securing feature 310, and the extension members 308*b* and 308*d* may be configured to couple together using an extension member securing feature 312. The extension member securing feature 310 may include an extension slot 310*a* defined by the extension member 308*a* and an extension slot 310*b* defined by the extension member 308*b*. The extension slots 310*a* and 310*b* may be configured to overlap such that an extension coupling member 310*c* may extend through the extension slots 310*a* and 310*b*. The extension coupling member 310*c* may include a bolt 310*d* and a nut 310*e* that both assist in the adjustment of the extension members 308*a* and 308*c* along the extension slots 310*a* and 310*b* as well as securing the extension members 308*a* and 308*c* from being extended or moved. For example, when the extension coupling member 310*c* is in a secure orientation, movement of the extension members 308*a* and 308*c* in relation to each other is prevented. When the extension coupling member 310*c* is in an unsecure orientation, movement of the extension members 308*a* and 308*c* in relation to each other is permitted. While the extension coupling member 310*c* is illustrated as including a bolt 310*d* and a nut 310*e*, the extension coupling member 310*c* may include other extension coupling members that would be apparent to one of skill in the art in possession of the present disclosure. For example, the extension coupling member 310*c* may include a set of magnets, a loop and hook system, frictional coupling elements (e.g., a snap closure), a clip system, a strap and buckle system, one or more buttons, and/or other coupling members or combination of coupling members that would be apparent to one of skill in the art that may or may not allow for adjustment.

Similarly, the extension member securing feature 312 may include an extension slot 312*a* defined by the extension member 308*b* and an extension slot 312*b* defined by the extension member 308*d*. The extension slots 312*a* and 312*b* may be configured to overlap such that an extension coupling member 312*c* may extend through the extension slots 312*a* and 312*b*. The extension coupling member 312*c* may include a bolt 312*d* and a nut 312*e* that both assist in the adjustment of the extension members 308*b* and 308*d* along the extension slots 312*a* and 312*b* as well as securing the extension members 308*b* and 308*d* from being extended or moved. For example, when the extension coupling member 312*c* is in a secure orientation, movement of the extension members 308*b* and 308*d* in relation to each other is prevented. When the extension coupling member 312*c* is in an unsecure orientation, movement of the extension members 308*b* and 308*d* in relation to each other is permitted. While the extension coupling member 312*c* is illustrated as including a bolt 312*d* and a nut 312*e*, the extension coupling member 312*c* may include other extension coupling members that would be apparent to one of skill in the art in possession of the present disclosure. For example, the extension coupling member 312*c* may include a set of magnets, a loop and hook system, frictional coupling elements (e.g., a snap closure), a clip system, a strap and buckle system, one or more buttons, and/or other coupling members or combination of coupling members that would be apparent to one of skill in the art that may or may not allow for adjustment.

In various embodiments, the template planar member 301 may define at least one slot that extends from a front face to a rear face (e.g., the first sub-member front face 302*a* to the first sub-member rear face 302*b* and/or the second sub-member front face 304*a* to the second sub-member rear face 304*b*). The slots may be of various shapes. For example, and as illustrated in FIGS. 3A-3G, the template planar member 301 on the first planar sub-member 302 may define a horizontal slot 314*a*, a curved slot 314*b*, a vertical slot 314*c* that all join at an origin aperture 316. Similarly, the second planar sub-member 304 may define a horizontal slot 318*a*, a curved slot 318*b*, a vertical slot 318*c* that all join at an origin aperture 320. As illustrated the slots 318*a*-318*c* may be a mirror of respective slots 314*a*-314*c*. As such, the template planar member 301 may provide a template for a user to make symmetrical and/or asymmetrical cuts on both sides of an object such as an article of clothing. While specific slot shapes are illustrated, one of skill in the art in possession of the present disclosure will recognize that other shapes for the slots 314*a*-314*c* may be contemplated as well.

In various embodiments, the template planar member 301 may include a cutting device system 322 in the first planar sub-member 302. The cutting device system 322 may include a blade 322*a*, an elongated member 322*b*, and a user guide 322*c*. The blade 322*a* may be coupled to the user guide 322*c* via the elongated member 322*b*. The elongated member 322*b* may be configured to the shape of the slots 314*a*-314*c* such that the cutting device system 322 may be moved along each slot 314*a*-314*c*. The blade 322*a* may be configured to be of a material and sharpness based on the material that is being cut with the blade 322*a*. For example, the blade 322*a* may include a metal material (e.g., stainless steel) that may be sharpened to cut fabric, cotton, leather, silk, nylon, wool, and/or any other textile that would be apparent to one of skill in the art. Other materials such as plastic, ceramic, and/or other materials that are based on a material from which an object or a consumer good is manufactured may be contemplated for the blade 322*a*. The blade 322*a* and the elongated member 322*b* may be rotatable in the origin aperture 316 such that a user, via the user guide 322*c* (e.g., a knob, a handle, etc.), may select which of the slots 314*a*-314*c* the blade 322*a* is to traverse. The blade 322*a* may extend from the first sub-member rear face 302*b* and the user guide 322*c* may extend from the first sub-member front face 302*a*. In some embodiments, the cutting device system 322 may include stopper 322*d* that is configured to couple the cutting device system 322 to the first planar sub-member 302 such that the cutting device system 322 cannot be removed from the first planar sub-member 302 and/or provide an adjustable depth the cut provided by the blade 322*a*.

Similarly, in various embodiments, the template planar member 301 at the second planar sub-member 304 may include a cutting device system 324 at the origin aperture 320. In some embodiments, the cutting device system 324 includes the cutting device system 322 or is a separate cutting device system 324 that is similar to the cutting device system 322.

In various embodiments, the receptacle template system 300 may include a guard system 326 that includes a guard member 326*a* that is configured to couple to the first sub-member rear face 302*b* of the first planar sub-member 302. The guard member 326*a* may include a template coupling feature 326*b* that may be configured to couple with a corresponding guard coupling feature 328*a* include on the first planar sub-member 302 or a guard coupling feature 328*b* included on the second planar sub-member 304. When the guard member 326*a* is coupled to the first planar sub-member 302, a space 332 is defined that allows for the object or a portion of the object that is to receive a cut to be positioned. The space 332 and the guard member 326*a* prevents the blade 322*a* from extending past the guard member 326*a*. By providing the guard system 326, the guard system 326 may protect the user and/or the object from undesired cuts from the blade 322*a* during operation. The guard system 326 may also stabilize and secure the object with the template planar member 301 during the cutting process.

Figure 4:
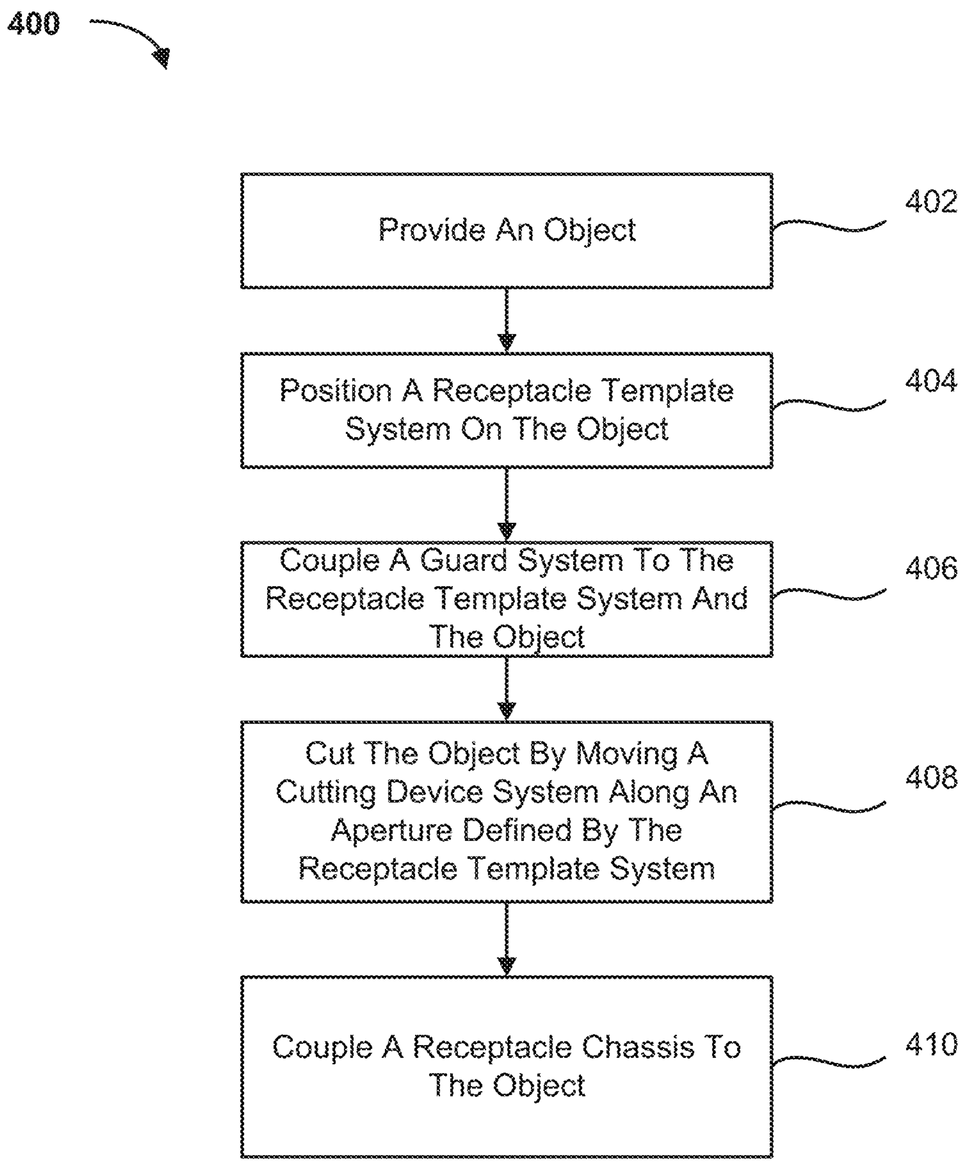
FIG. 4 illustrates a flowchart of a process of installing the receptacle system of FIGS. 1A-1D or 2A-2C using the receptacle template system of FIGS. 3A-3G, in accordance with some embodiments of the present disclosure.
Figure 5:
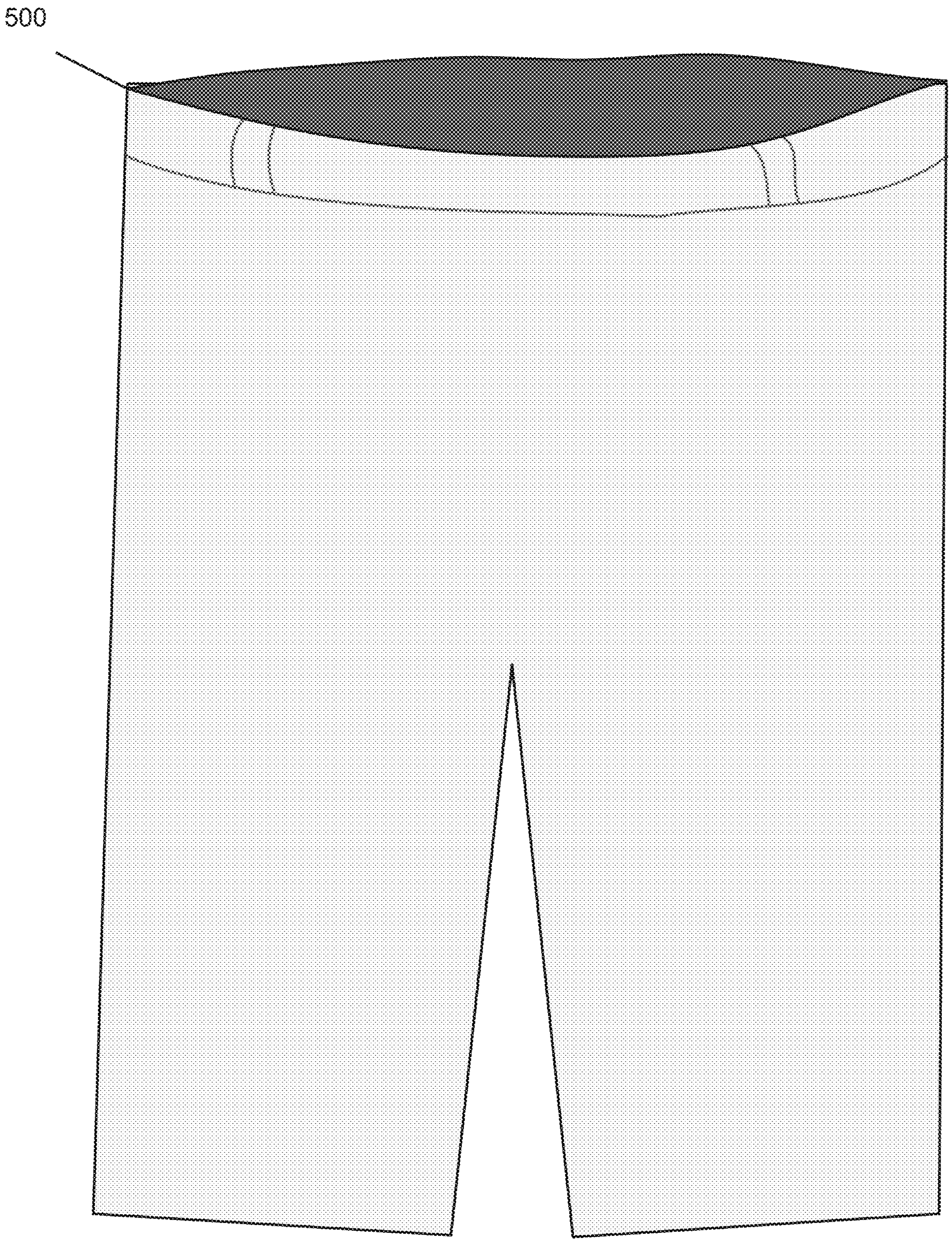
FIG. 5 illustrates an object on which the receptacle device is installed during the process of FIG. 4, in accordance with some embodiments of the present disclosure.

Referring now to FIG. 4, a process 400 for installing a receptacle system 100 FIGS. 1A-1D or a receptacle system 200 of FIGS. 2A-2C using the template system 300 of FIGS. 3A-3G is illustrated. The process 400 may begin at block 402 where an object is provided. In an embodiment, at block 402 and with reference to FIG. 5, an object 500 (e.g., a pair of pants without a front pocket) is provided. However, in other embodiments, the object 500 may be an object that already has a pocket or a receptacle that is being replaced by a receptacle system 100 or 200. In other embodiments, the object 500 may be an object that does not require a cut for interior position of the receptacle system 100 or 200 such that the receptacle system 100 or 200 may be coupled to a face of the object 500.

Figure 6:
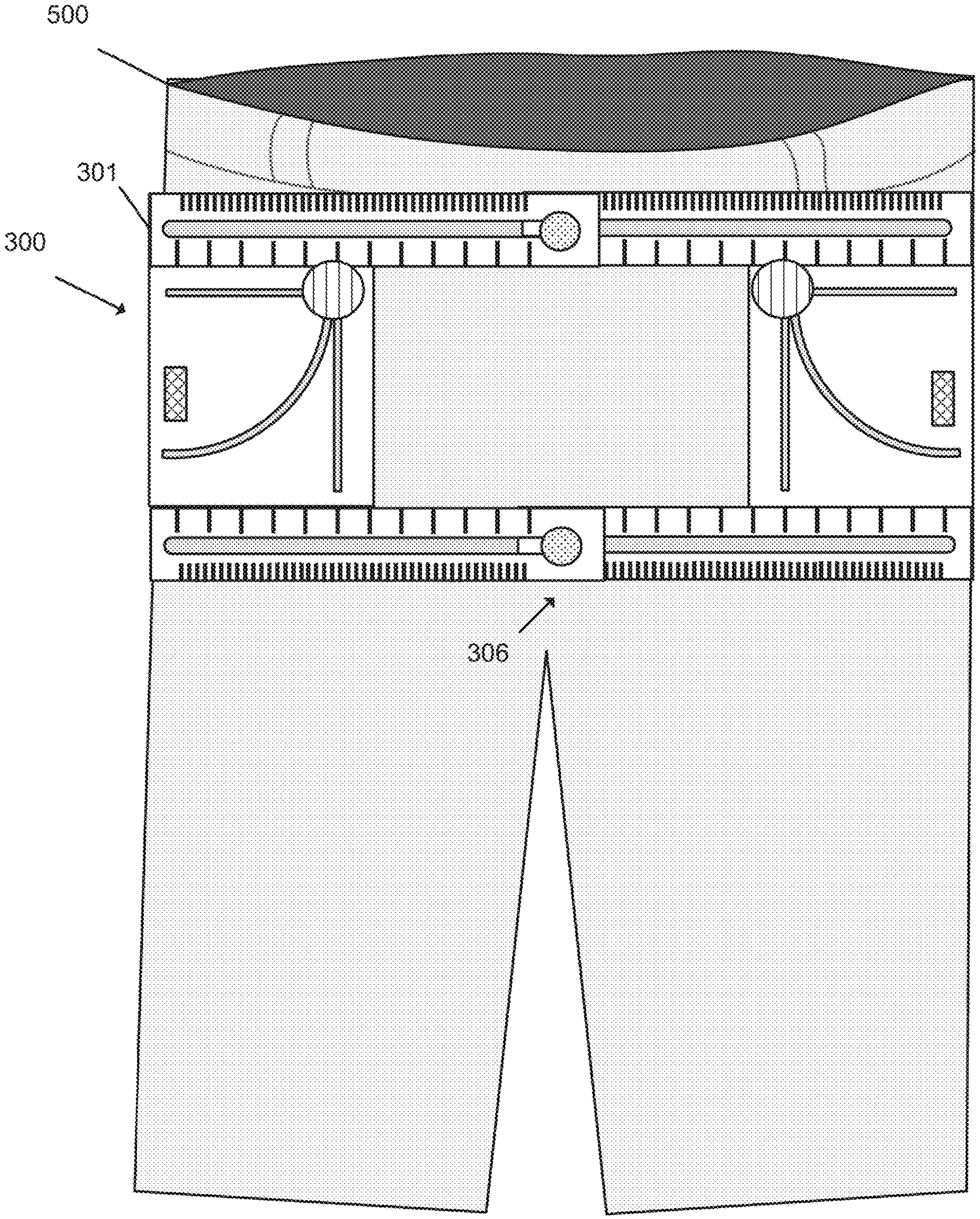
FIG. 6 illustrates the object of FIG. 5 and the receptacle template system of FIGS. 3A-3G during the process of FIG. 4, in accordance with some embodiments of the present disclosure.

The process 400 may then proceed to block 404 where a receptacle template system is positioned on an object. In an embodiment, and with reference to FIG. 6, the receptacle template system 300 of FIGS. 3A-3G may be positioned on the object 500 of FIG. 5. The receptacle template system 300 may be positioned where the user desires to make a cut on the object 500. For example, the adjustment system 306 may be adjusted by a user to a position that the user desires to make the cut. In the specific example of the pants, the user may want symmetrical or substantially symmetrical pockets on the front of the pants. The adjustment system 306 to position and size the template planar member 301 to the appropriate length, height, and/or width. In various embodiments, block 404 may be optional as some objects 500 may already have an opening for the receptacle system 100 or the receptacle system 100 is to be attached to an exterior surface of the object 500, and thus the receptacle template system 300 may not be necessary in such scenarios and the process 400 described herein.

Figure 7:
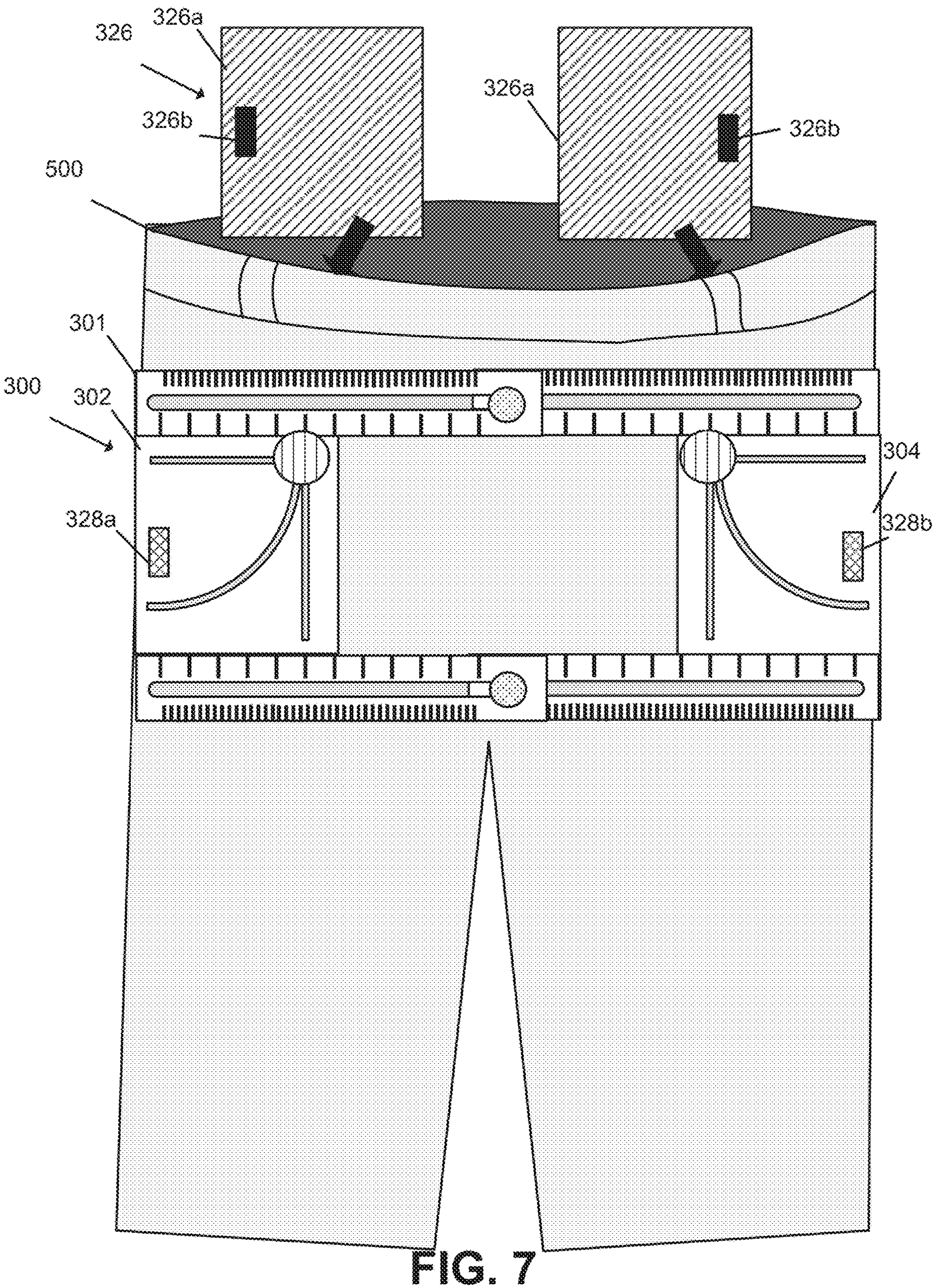
FIG. 7 illustrates the object of FIG. 5 and the receptacle template system of FIGS. 3A-3G during the process of FIG. 4, in accordance with some embodiments of the present disclosure.

The process 400 may then proceed to block 406 where a guard system is coupled to the template planar member. In an embodiment, at block 406 and with reference to FIG. 7, the guard system 326 including the guard member(s) 326*a* are illustrated as being inserted into the object 500 such that the front fabric of the object 500 is between the guard member(s) 326*a* the first planar sub-member 302 and/or the second planar sub-member 304. The template coupling feature 326*b* may couple to the corresponding guard coupling feature 328*a* or the guard coupling feature 328*b*. The guard system 326 may then be coupled to the object 500.

Figure 8:
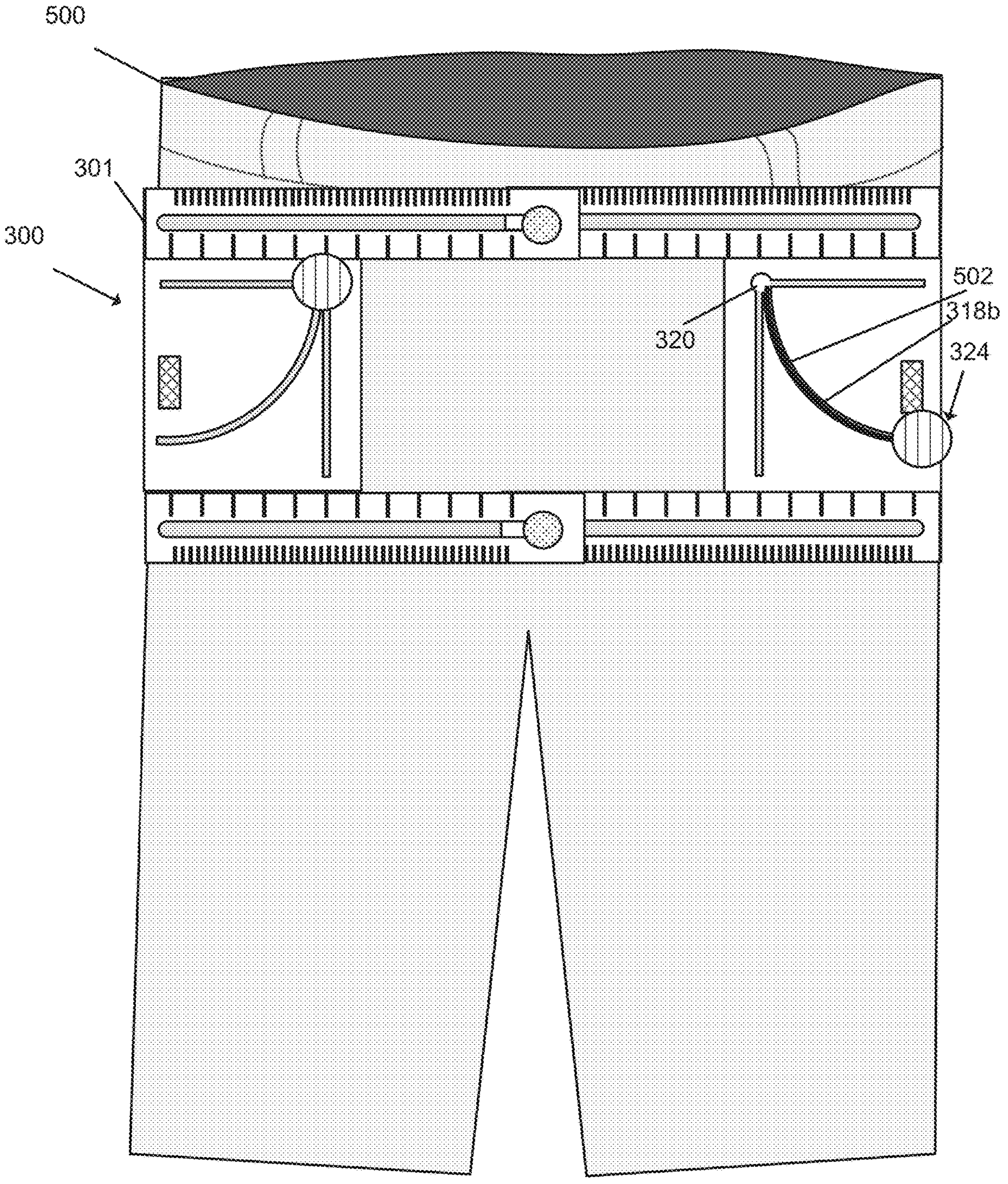
FIG. 8 illustrates the object of FIG. 5 and the receptacle template system of FIGS. 3A-3G during the process of FIG. 4, in accordance with some embodiments of the present disclosure.
Figure 9:
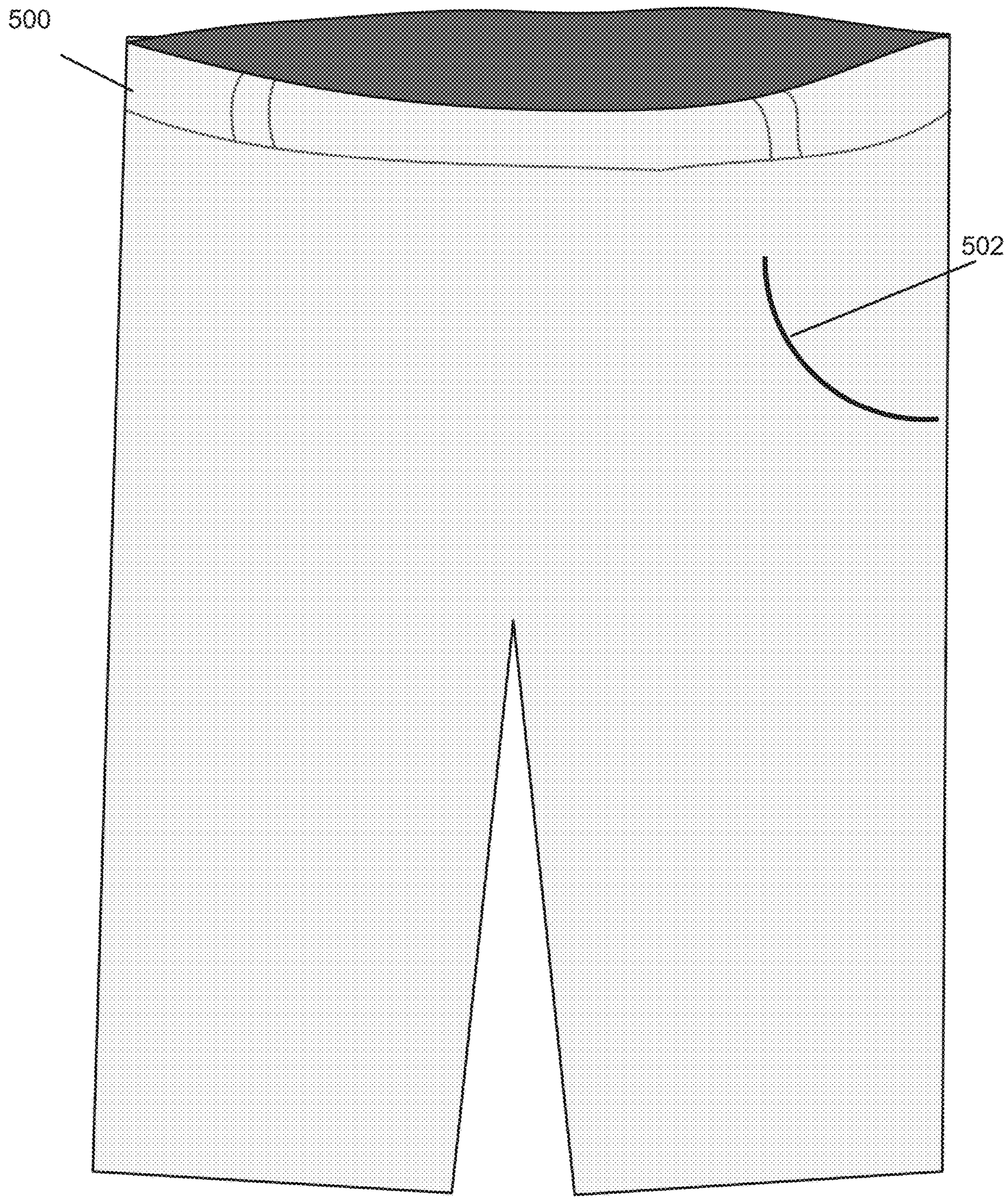
FIG. 9 illustrates the object of FIG. 5 with a cut using the receptacle template system of FIGS. 3A-3G during the process of FIG. 4, in accordance with some embodiments of the present disclosure.

The process 400 may then proceed to block 408 where an object is cut by moving a cutting device system along an aperture defined by the template planar member 301 such that the object defines an object aperture. In an embodiment at block 408 and with reference to FIG. 8, the user may select the template provided by the curved slot 318*b* defined in the second planar sub-member 304 by turning the cutting device system 324 and moving the cutting device system 324 from the origin aperture 320 to an opposite end of the curved slot 318*b*. As a result, an object aperture 502 is defined by the object 500, as illustrated if FIG. 9.

Figure 10:
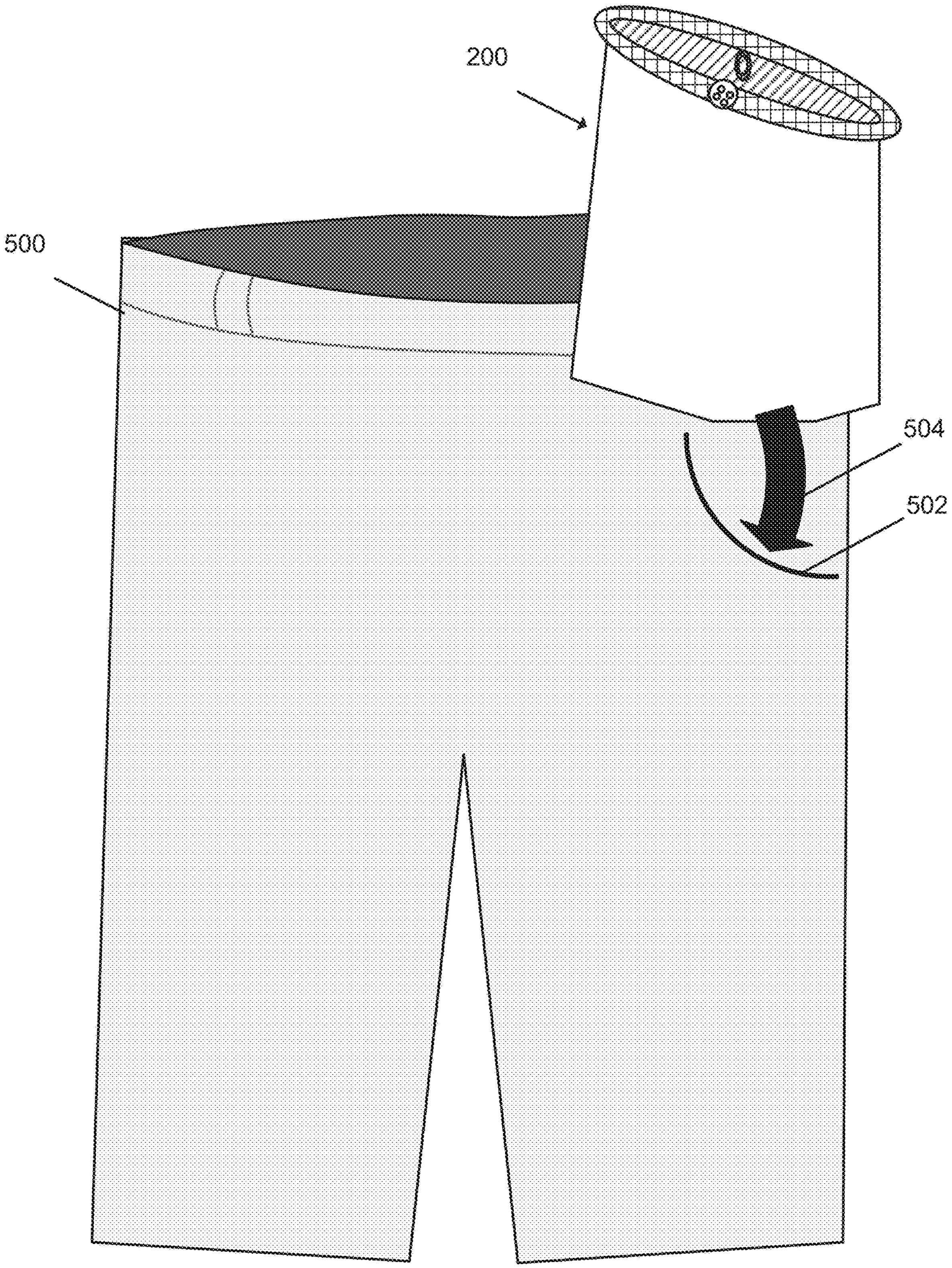
FIG. 10 illustrates the receptacle system of FIGS. 2A-2C with the object of FIG. 5 during the process of FIG. 4, in accordance with some embodiments of the present disclosure.
Figure 11:
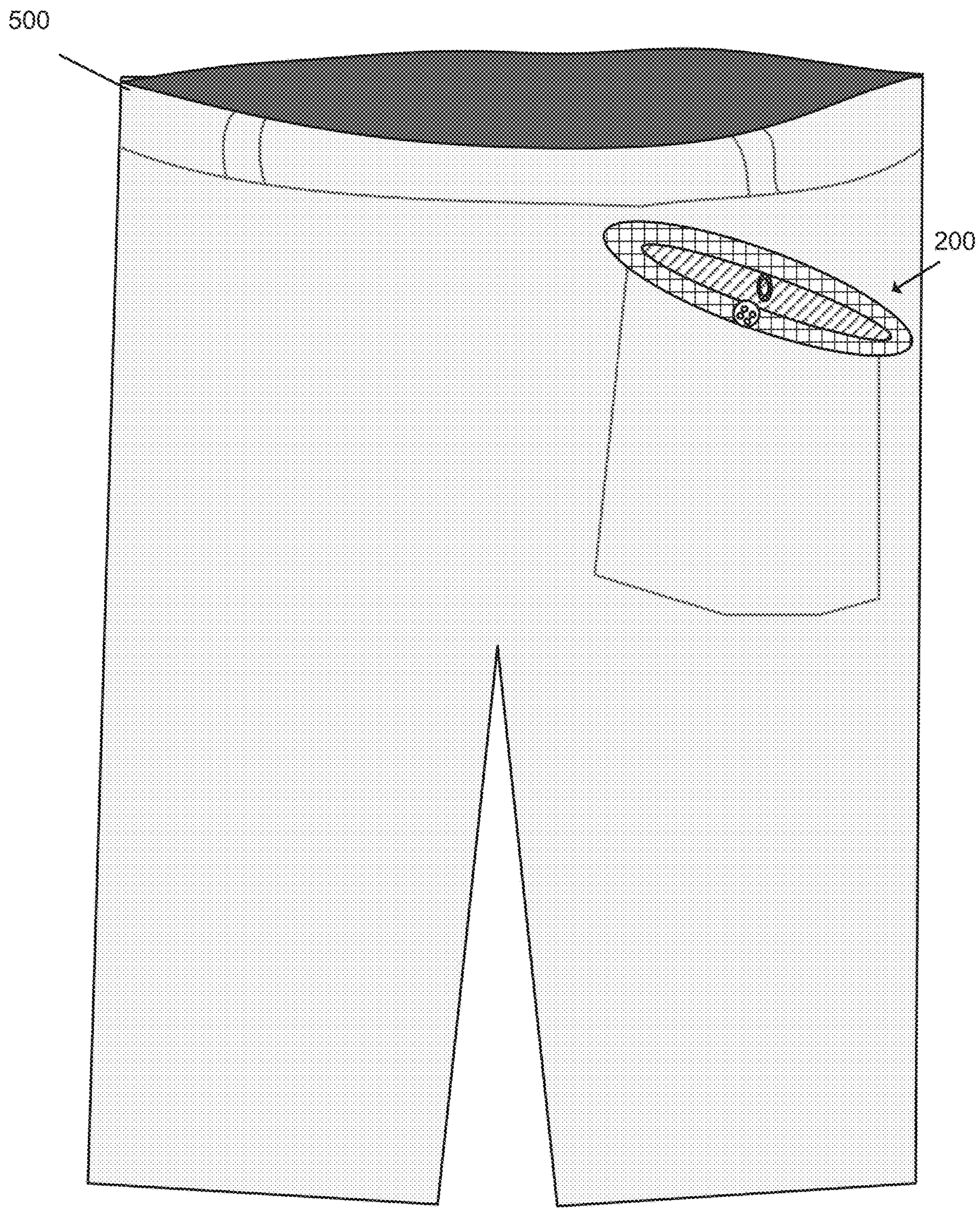
FIG. 11 illustrates the receptacle system of FIGS. 2A-2C with the object of FIG. 5 during the process of FIG. 4, in accordance with some embodiments of the present disclosure.
Figure 12:
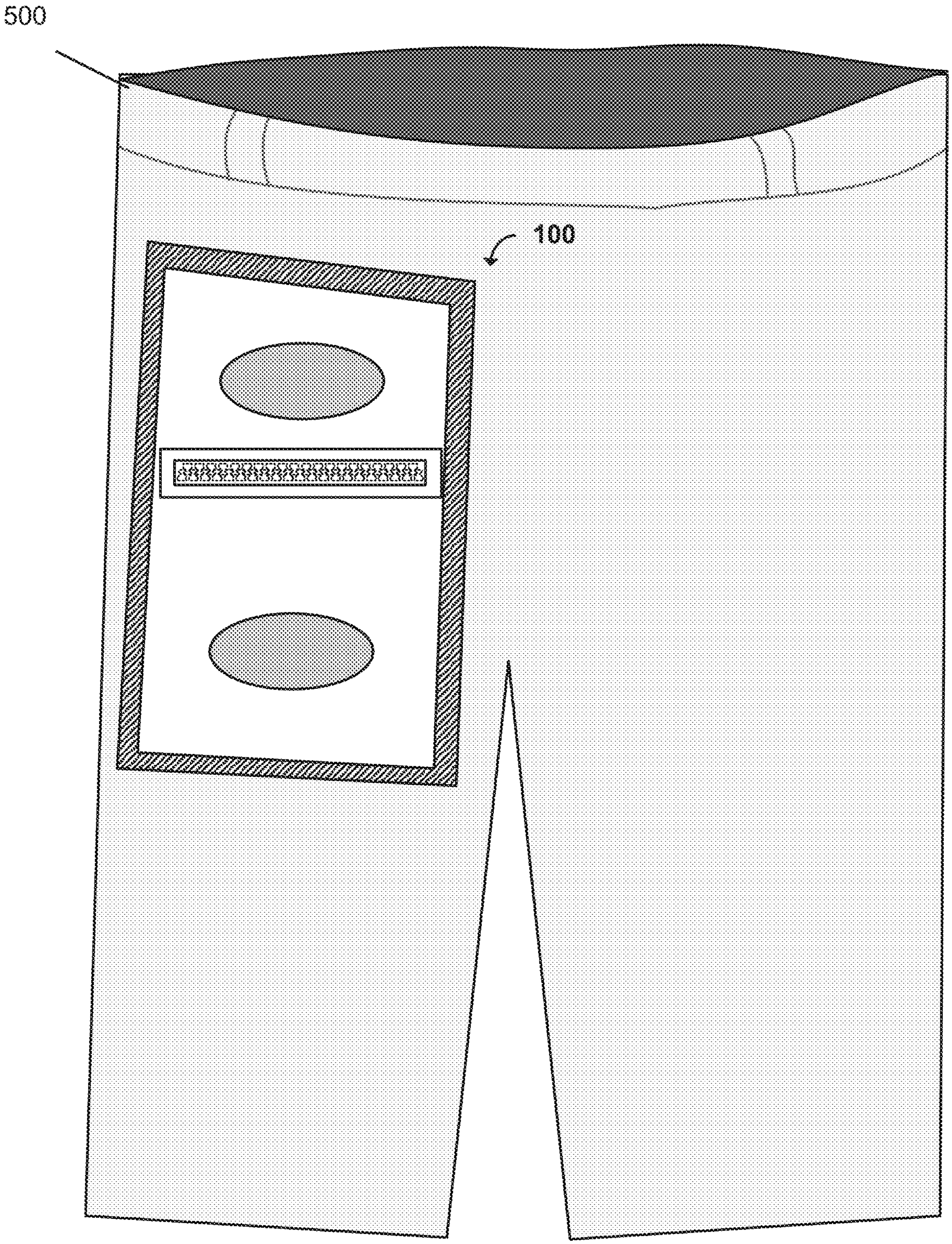
FIG. 12 illustrates the receptacle system of FIGS. 1A-1D with the object of FIG. 5 during the process of FIG. 4, in accordance with some embodiments of the present disclosure.

The process 400 may then proceed to block 410 where a receptacle chassis is coupled to the object. In an embodiment, at block 410 and with reference to FIG. 10, the receptacle system 200 may be selected and inserted, as indicated by arrow 504, into the object aperture 502. The receptacle chassis 201 may be coupled to the object 500 via the trim fastener 212 included on the trim element 210, the first set of object securing elements 216*a*, and/or the second set of object securing elements 216*b* with reference to FIG. 11. However, in various embodiments, the receptacle chassis 101 or 201 may be coupled to the exterior of the object 500, as illustrated in FIG. 12, and/or may be coupled to a pocket or another object receptacle where the object aperture already exists such as to resize (e.g., make bigger, make smaller, change shape) the object receptacle with the receptacle system 100 or 200. While a specific process 400 is described, one of skill in the art will recognize that other modifications and alternatives may be contemplated.

The reader should appreciate that the present application describes several independently useful techniques. Rather than separating those techniques into multiple isolated patent applications, applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system"

performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A receptacle system, comprising: a receptacle chassis that defines a volume and that defines, at a first edge of the receptacle chassis, an aperture that provides access to the volume, wherein the receptacle chassis includes: a first face that is adjacent the volume; and a second face that is opposite the receptacle chassis from the first face and that is adjacent to an exterior volume; and an object securing system that is included on at least one of the first face or the second face, and that is configured to secure the receptacle chassis to an object.

2. The receptacle system of claim 1, further comprising: a trim element that is coupled to the first edge of the receptacle chassis and that is configured to couple to a portion of the object that defines an object aperture such that the aperture of the receptacle chassis is accessible via the object aperture.

3. The receptacle system of claim 1, further comprising: an aperture closure element that is included on the first edge of the receptacle chassis and that is configured to transition between an open orientation and a closed orientation, wherein the open orientation provides greater access, via the aperture, between the exterior volume and the volume than the closed orientation.

4. The receptacle system of claim 1, wherein the object securing system includes a first set of object securing elements that are included on the first face and that are configured to couple the receptacle chassis to the object.

5. The receptacle system of claim 4, wherein the object securing system includes a second set of object securing elements that are included on the second face and that are configured to couple the receptacle chassis to the object, wherein the first set of object securing elements includes a first type securing element that, when coupled to the object, requires a first force to decouple that first type securing element from the object, and the second set of object securing elements includes a second type securing element that, when coupled to the object, requires a second force to decouple the second type securing element from the object that is greater than the first force.

6. The receptacle system of claim 5, wherein the second set of object securing elements are positioned closer to an edge of the receptacle chassis than the first set of object securing elements.

7. The receptacle system of claim 5, wherein the first type securing element includes a first type adhesive and the second type securing element includes a second type adhesive.

8. The receptacle system of claim 7, wherein the object securing system includes a first type adhesive removable cover that covers the first type adhesive and that indicates the first type adhesive to a user, and wherein the object securing system includes a second type removable adhesive cover that covers the second type adhesive and that indicates the second type adhesive.

9. The receptacle system of claim 1, wherein the receptacle chassis includes a first textile material and the object comprises a second textile material to which object securing system couples.

10. The receptacle system of claim 1, wherein the receptacle chassis comprises a first chassis base portion and a second chassis base portion, wherein the first chassis base portion and the second chassis base portion are coupled together along at least one second edge.

11. The receptacle system of claim 1, wherein the receptacle chassis comprises an expandable member on at least one second edge.

12. The receptacle system of claim 1, further comprising: a receptacle template system that is configured to guide a cutting device that generates an object aperture when the receptacle template system is positioned on the object.

13. A receptacle template system, comprising a planar member having a first face and a second face that is opposite the planar member from the first face, wherein the planar member: defines a first slot that extends through the planar member from the first face to the second face and that is configured to receive a cutting device, and defines a second slot that extends through the planar member from the first face to the second face and that is configured to receive a cutting device.

14. The receptacle template system of claim 13, wherein the first slot is defined on a first section of the planar member and the second slot is a mirrored version of the first slot on a second section of the planar member.

15. The receptacle template system of claim 13, wherein the first slot and the second slot share a common origin defined by the planar member.

16. The receptacle template system of claim 13, wherein the planar member includes: a first planar sub-member that defines the first slot; and a second planar sub-member that defines the second slot, and wherein the receptacle template system further comprises: an adjustment system that is configured to: permit adjustment of the first planar sub-member with respect to the second planar sub-member when in an adjustment orientation; and prohibit adjustment of the first planar sub-member with respect to the second planar sub-member when in a locked orientation.

17. The receptacle template system of claim 13, further comprising: a cutting device system that includes a cutting blade and that is coupled to the planar member such that the cutting blade is inserted into the first slot on the first face such that the cutting blade extends past the second face and the cutting device is movable along the first slot.

18. The receptacle template system of claim 13, further comprising: a guard system configured to couple to the planar member when an object is positioned between the planar member and a guard member included in the guard system.

19. The receptacle template system of claim 13, further comprising: a cutting device system that includes a cutting blade and that is coupled to the planar member such that the cutting blade is inserted into the first slot on the first face such that the cutting blade extends past the second face and the cutting device system is movable along the first slot; a guard system configured to couple to the planar member when an object is positioned between the planar member and a guard member included in the guard system, wherein the guard member is configured to prevent the cutting blade from extending through the guard member; an adjustment system that is configured to: permit adjustment of a first planar sub-member that is included in the planar member with respect to a second planar sub-member that is included in the planar member when in an adjustment orientation; and prohibit adjustment of the first planar sub-member with respect to the second planar sub-member when in a locked orientation, wherein the first slot and the second slot share a first common origin and that are defined on the first planar sub-member, wherein a third slot and a fourth slot are defined by the second planar sub-member, are a mirrored version of the first slot and the second slot, respectively, and share a second common origin, and wherein the first common origin is configured to selectively move the cutting blade along the first slot or the second slot.

20. A method, comprising: positioning, on an object, a receptacle template system that includes a planar member having a first template face and a second template face that is opposite the planar member from the first template face; cutting, using a cutting device, the object by moving the cutting device along a template aperture defined by the receptacle template system such that the object defines an object aperture; and coupling, to the object, a receptacle chassis that defines a volume and that defines, at a first edge of the receptacle chassis, an aperture that provides access to the volume, wherein the receptacle chassis includes: a first receptacle face that is adjacent the volume; and a second receptacle face that is opposite the receptacle chassis from the first receptacle face and that is adjacent to an exterior volume, and wherein the coupling the receptacle chassis to the object includes securing, to a portion of the object that defines the object aperture, an object securing system that is included on a trim element that is coupled to the first edge of the receptacle chassis such that the aperture of the receptacle chassis is accessible via the object aperture.

What is claimed is:

1. A receptacle template system, comprising a planar member having a first face and a second face that is opposite the planar member from the first face, wherein the planar member:

defines a first slot that extends through the planar member from the first face to the second face and that is configured to receive a cutting device, and defines a second slot that extends through the planar member from the first face to the second face and that is configured to receive a cutting device.

2. The receptacle template system of claim 1, wherein the first slot is defined on a first section of the planar member and the second slot is a mirrored version of the first slot on a second section of the planar member.

3. The receptacle template system of claim 1, wherein the first slot and the second slot share a common origin defined by the planar member.

4. The receptacle template system of claim 1, wherein the planar member includes:

a first planar sub-member that defines the first slot; and a second planar sub-member that defines the second slot, and wherein the receptacle template system further comprises:

an adjustment system that is configured to:

permit adjustment of the first planar sub-member with respect to the second planar sub-member when in an unsecure orientation; and prohibit adjustment of the first planar sub-member with respect to the second planar sub-member when in a secure orientation.

5. The receptacle template system of claim 1, further comprising:

a cutting device system that includes a cutting blade and that is coupled to the planar member such that the cutting blade is inserted into the first slot on the first face such that the cutting blade extends past the second face and the cutting device is movable along the first slot.

6. The receptacle template system of claim 1, further comprising:

a guard system configured to couple to the planar member when an object is positioned between the planar member and a guard member included in the guard system.

7. The receptacle template system of claim 1, further comprising:

a cutting device system that includes a cutting blade and that is coupled to the planar member such that the cutting blade is inserted into the first slot on the first face such that the cutting blade extends past the second face and the cutting device system is movable along the first slot;

a guard system configured to couple to the planar member when an object is positioned between the planar member and a guard member included in the guard system, wherein the guard member is configured to prevent the cutting blade from extending through the guard member; and an adjustment system that is configured to:

permit adjustment of a first planar sub-member that is included in the planar member with respect to a second planar sub-member that is included in the planar member when in an adjustment orientation; and prohibit adjustment of the first planar sub-member with respect to the second planar sub-member when in a locked orientation, wherein the first slot and the second slot share a first common origin and that are defined on the first planar sub-member, wherein a third slot and a fourth slot are defined by the second planar sub-member, are a mirrored version of the first slot and the second slot, respectively, and share a second common origin, and wherein the first common origin is configured to selectively move the cutting blade along the first slot or the second slot.

8. The receptacle template system of claim 4, wherein adjustment of the first planar sub-member with respect to the second planar sub-member when the adjustment system is in the unsecure orientation or prevention of adjustment of the first planar sub-member with respect to the second planar sub-member when the adjustment system is in the secure orientation is regulated by an extension coupling member.

9. The receptacle template system of claim 4, further comprising:

a means for switching the adjustment system between the unsecure orientation and the secure orientation.

10. The receptacle template system of claim 6, further comprising:

a means for coupling the guard system to the planar member.

11. A method, comprising:

positioning, on an object, a receptacle template system that includes a planar member having a first template face and a second template face that is opposite the planar member from the first template face; and cutting, using a cutting device, the object by moving the cutting device along a template aperture defined by the receptacle template system such that the object defines a first object aperture.

12. The method of claim 11, wherein the planar member includes:

a first planar sub-member that defines a first slot; and a second planar sub-member that defines a second slot, and the method further comprises:

adjusting the first planar sub-member with respect to the second planar sub-member when in an adjustment system coupled to the first planar sub-member and the second planar sub-member is in unsecure orientation.

13. The method of claim 12, further comprising:

prohibiting adjustment of the first planar sub-member with respect to the second planar sub-member when the adjustment system is in a secure orientation.

14. The method of claim 13, further comprising:

changing the adjustment system between the secure orientation and the unsecure orientation.

15. The method of claim 12, wherein the template aperture is the first slot.

16. The method of claim 15, further comprising:

cutting, using the cutting device or a second cutting device, the object by moving the cutting device or the second cutting device along the second slot such that the object defines a second object aperture.

17. The method of claim 11, further comprising:

coupling a guard system to the planar member such that the object is between the guard system and the planar member.

18. The method of claim 17, wherein the guard system is coupled to the planar member prior to cutting the object.

19. The method of claim 11, further comprising:

coupling, to the object, a receptacle chassis that defines a volume and that defines, at a first edge of the receptacle chassis, an aperture that provides access to the volume.

20. The method of claim 19, wherein the receptacle chassis includes:

a first receptacle face that is adjacent the volume; and a second receptacle face that is opposite the receptacle chassis from the first receptacle face and that is adjacent to an exterior volume, wherein the coupling the receptacle chassis to the object includes securing, to a portion of the object that defines the first object aperture, an object securing system that is included on a trim element that is coupled to the first edge of the receptacle chassis such that the aperture of the receptacle chassis is accessible via the first object aperture.

* * * * *